United States Patent
O'Shea et al.

(10) Patent No.: US 11,991,658 B2
(45) Date of Patent: *May 21, 2024

(54) LEARNING COMMUNICATION SYSTEMS USING CHANNEL APPROXIMATION

(71) Applicant: DeepSig Inc., Arlington, VA (US)

(72) Inventors: Timothy J. O'Shea, Arlington, VA (US); Ben Hilburn, Reston, VA (US); Tamoghna Roy, Arlington, VA (US); Nathan West, Washington, DC (US)

(73) Assignee: DeepSig Inc., Arlington, VA (US)

( * ) Notice: Subject to any disclaimer, the term of this patent is extended or adjusted under 35 U.S.C. 154(b) by 150 days.

This patent is subject to a terminal disclaimer.

(21) Appl. No.: 17/674,020

(22) Filed: Feb. 17, 2022

(65) Prior Publication Data

US 2022/0174634 A1 Jun. 2, 2022

Related U.S. Application Data

(60) Continuation of application No. 16/732,412, filed on Jan. 2, 2020, now Pat. No. 11,259,260, which is a
(Continued)

(51) Int. Cl.
*H04W 56/00* (2009.01)
*G06N 3/044* (2023.01)
(Continued)

(52) U.S. Cl.
CPC ........ *H04W 56/0035* (2013.01); *G06N 3/044* (2023.01); *G06N 3/08* (2013.01);
(Continued)

(58) Field of Classification Search
CPC ..... H04L 41/145; H04L 5/0005; H04L 41/16; H04W 16/22; H04W 56/0035;
(Continued)

(56) References Cited

U.S. PATENT DOCUMENTS

| 7,133,809 B1 | 11/2006 | Purkovic et al. |
| 10,396,919 B1 | 8/2019 | O'Shea et al. |

(Continued)

FOREIGN PATENT DOCUMENTS

CA 2977300 A1 * 2/2019

OTHER PUBLICATIONS

Arjovsky et al., "Wasserstein gan," arXiv preprint arXiv:1701.07875, 2017, 32 pages.
(Continued)

*Primary Examiner* — Mohamed A Kamara
(74) *Attorney, Agent, or Firm* — Fish & Richardson P.C.

(57) ABSTRACT

Methods, systems, and apparatus, including computer programs encoded on computer storage media, for training and deploying machine-learned communication over RF channels. In some implementations, information is obtained. An encoder network is used to process the information and generate a first RF signal. The first RF signal is transmitted through a first channel. A second RF signal is determined that represents the first RF signal having been altered by transmission through the first channel. Transmission of the first RF signal is simulated over a second channel implementing a machine-learning network, the second channel representing a model of the first channel. A simulated RF signal that represents the first RF signal having been altered by simulated transmission through the second channel is determined. A measure of distance between the second RF signal and the simulated RF signal is calculated. The machine-learning network is updated using the measure of distance.

20 Claims, 12 Drawing Sheets

Related U.S. Application Data division of application No. 16/291,936, filed on Mar. 4, 2019, now Pat. No. 10,531,415.

(60) Provisional application No. 62/664,306, filed on Apr. 30, 2018, provisional application No. 62/637,770, filed on Mar. 2, 2018.

(51) Int. Cl.
| | |
|---|---|
| *G06N 3/08* | (2023.01) |
| *G06N 3/084* | (2023.01) |
| *G06N 20/00* | (2019.01) |
| *H04B 17/391* | (2015.01) |
| *H04L 5/00* | (2006.01) |
| *H04L 41/14* | (2022.01) |
| *H04W 16/22* | (2009.01) |
| *H04W 72/0453* | (2023.01) |

(52) U.S. Cl.
CPC .............. *G06N 3/084* (2013.01); *G06N 20/00* (2019.01); *H04B 17/3912* (2015.01); *H04L 5/0005* (2013.01); *H04L 41/145* (2013.01); *H04W 16/22* (2013.01); *H04W 72/0453* (2013.01)

(58) Field of Classification Search
CPC ........... H04W 72/0453; H04B 17/3912; H04B 17/391; G06N 3/08; G06N 3/10; G06N 3/044; G06N 3/084; G06N 20/00; G06N 3/045; G06N 3/048; G06N 3/047; G06N 3/006; G06N 3/126
See application file for complete search history.

(56) References Cited

U.S. PATENT DOCUMENTS

| | | |
|---|---|---|
| 10,531,415 B2 | 1/2020 | O'Shea et al. |
| 11,259,260 B2 | 2/2022 | O'Shea et al. |
| 2011/0150113 A1 | 6/2011 | Oyman et al. |
| 2017/0163465 A1 | 6/2017 | Piazza et al. |
| 2018/0174050 A1 | 6/2018 | Holt et al. |
| 2018/0367192 A1 | 12/2018 | O'Shea et al. |
| 2019/0274108 A1 | 9/2019 | O'Shea et al. |
| 2020/0145951 A1 | 5/2020 | O'Shea et al. |

OTHER PUBLICATIONS

Chen et al., "Infogan: Interpretable representation learning by information maximizing generative adversarial nets," arXiv: 1606.03657, 2015, 14 pages.

Dörner et al., "Deep learning based communication over the air," IEEE Journal of Selected Topics in Signal Processing, Jul. 2017, 11 pages.

EP Supplementary Partial European Search Report in European Appln. No. 19760421.8 dated May 6, 2021, 21 pages.

Extended European Search Report in European Appln No. 19760421.8, dated Aug. 6, 2021, 17 pages.

Goodfellow et al., "Generative adversarial nets," in Advances in neural information processing systems, 2014, 2672-2680.

International Search Report and Written Opinion in International Appln. No. PCT/US19/20585, dated Jun. 20, 2019, 16 pages.

Mirza et al., "Conditional generative adversarial nets," arXiv, 2014, 7 pages.

O'Shea et al., "An introduction to deep learning for the physical layer," IEEE Transactions on Cognitive Communications and Networking, Dec. 2017, 563-575.

O'Shea et al., An introduction to machine learning communications systems, arXiv, Feb. 2017, 10 pages.

O'Shea et al., "Approximating the void: learning stochastic channel models from observation with variational generative adversarial networks," International Conference on Computing, Networking and Communications, May 2018, 6 pages.

O'Shea et al., "Deep learning based MIMO communications," arXiv e-prints, Jul. 2017, 9 pages.

O'Shea et al., "Learning to communicate: channel auto-encoders, domain specific regularizers, and attention," IEEE International Symposium on Signal Processing and Information Technology, Dec. 2016, 223-228.

O'Shea et al., "An introduction to deep learning for the physical layer," IEEE Transactions on Cognitive Communications and Networking, 2017, pp. (99):1-1.

O'Shea et al., "Physical layer communications system design over the-air using adversarial networks," arXiv preprint arXiv:1803.03145, Mar. 2018, 4 pages.

PCT International Preliminary Report on Patentability in International Appln. No. PCT/US2019/020585, dated Sep. 8, 2020, 6 pages.

Radford et al., "Unsupervised representation learning with deep convolutional generative adversarial networks," arXiv: 1511.06434, 2015, 16 pages.

Simone, "A very brief introduction to machine learning with applications to communication systems," IEEE Transactions on Cognitive Communications and Networking, 2018, 4(4):648-664.

Srivastava et al., "Veegan: Reducing mode collapse in gans using implicit variational learning," in Advances in Neural Information Processing Systems, 2017, 3310-3320.

* cited by examiner

LEARNING COMMUNICATION SYSTEMS USING CHANNEL APPROXIMATION

CROSS-REFERENCE TO RELATED APPLICATION

This application is a continuation of Ser. No. 16/732,412, filed Jan. 2, 2020, now allowed, which is a divisional of Ser. No. 16/291,936, filed Mar. 4, 2019, now U.S. Pat. No. 10,531,415, which claims priority to U.S. Provisional Application No. 62/664,306, filed Apr. 30, 2018, and U.S. Provisional Application No. 62/637,770, filed Mar. 2, 2018. The disclosure of these prior applications are considered part of and are incorporated by reference in the disclosure of this application.

TECHNICAL FIELD

The present disclosure relates to communication channel modeling using machine-learning networks.

BACKGROUND

Communication systems have usually been constructed by manually defining and implementing modulation and coding algorithms based on analytic models derived with convenient algebraic expressions. In some instances, simplified analytic models are used (e.g., to represent a model for the communications channel). These usual methods for constructing communication systems require manual input, can be inefficient, and often do not accurately account for many effects of real-world communication channels. As such, there is a need for an efficient and automatic method for constructing a communication system that can account for effects of real-world communication channels (e.g., through measurement and adaptation).

SUMMARY

The present disclosure describes methods, apparatus, and systems to learn and deploy a communications system by using an encoder machine-learning network, a decoder machine-learning network, and an approximated communications channel implementing a channel machine-learning network. The machine-learning networks of the system are adversarially optimized, such that the objective functions of the encoder machine-learning network and/or the decoder machine-learning network compete with the objective function of the channel machine-learning network.

In some implementations, adversarially optimizing the machine-learning networks includes optimizing the encoder machine-learning network and/or the decoder machine-learning network iteratively with the channel machine-learning network.

In some implementations, adversarially optimizing the machine-learning networks includes optimizing the encoder machine-learning network and/or the decoder machine-learning network jointly with the channel machine-learning network.

The present disclosure also describes methods, apparatus and systems to learn and deploy a communications system that includes an approximated communications channel implementing a channel machine-learning network and a discriminator machine-learning network. The channel machine-learning network may be a variational and/or conditional generator network. The machine-learning networks of the system are adversarially optimized, such that the objective function of the discriminator machine-learning network competes with the objective function of the channel machine-learning network. In some implementations, these may further compete with the objective functions for training an encoder and/or decoder machine-learning network.

In some implementations, adversarially optimizing the machine-learning networks includes optimizing the discriminator machine-learning network iteratively with the channel machine-learning network.

In some implementations, adversarially optimizing the machine-learning networks includes optimizing the discriminator machine-learning network jointly with the channel machine-learning network.

In one aspect, a method includes obtaining first information; using an encoder machine-learning network to process the first information and generate a first radio-frequency signal; transmitting the first radio-frequency signal through a first communication channel; determining a second radio-frequency signal that represents the first radio-frequency signal having been altered by transmission through the first communication channel; simulating transmission of the first radio-frequency signal over a second communication channel implementing a channel machine-learning network, the second communication channel representing a model of the first communication channel; determining a simulated radio-frequency signal that represents the first radio-frequency signal having been altered by simulated transmission through the second communication channel; calculating a first measure of distance between the second radio-frequency signal and the simulated radio-frequency signal; and updating the channel machine-learning network using the first measure of distance.

In some implementations, the method further includes: using a decoder machine-learning network to process the simulated radio-frequency signal and generate second information that is a reconstruction of the first information; calculating a second measure of distance between the second information and the first information; and updating at least one of the encoder machine-learning network or the decoder machine-learning network using the second measure of distance.

In some implementations, the method further includes: calculating a combined distance using the first measure of distance and the second measure of distance; and updating at least one of the encoder machine-learning network, the decoder machine-learning network, or the channel machine-learning network using the combined distance.

In some implementations, the encoder machine-learning network, the decoder machine-learning network, and the channel machine-learning network of the approximated channel are updated concurrently.

In some implementations, the encoder machine-learning network or the decoder machine-learning network, and the channel machine-learning network are updated iteratively.

In some implementations, updating the channel machine-learning network includes: inserting a reference tone into the first radio-frequency signal at an offset time; determining a time at which the first radio-frequency signal has passed through the first communication channel; using the reference tone and the time at which the first radio-frequency signal has passed through the first communication channel to determine at least one of timing or frequency of the first radio-frequency signal; receiving the second radio-frequency signal; and using the timing or frequency of the first radio-frequency signal to remove alignment errors from the second radio-frequency signal.

In some implementations, updating the channel machine-learning network includes: using a digital to analog converter to process the first radio-frequency signal, where the digital to analog converter receives a signal from a time source; using an analog to digital converter to produce the second radio-frequency signal, where the analog to digital converter receives a signal from the time source; and using a known timing of the time source to align the second radio-frequency signal with the first radio-frequency signal.

In some implementations, at least one of the encoder machine-learning network, the decoder machine-learning network, or the channel machine-learning network of the approximated channel includes one of a dense neural network (DNN), a convolutional neural network (CNN), or a recurrent neural network (RNN) includes parametric multiplications, additions, and non-linearities.

In some implementations, the first measure of distance includes at least one of (i) a cross-entropy between the second radio-frequency signal and the simulated radio-frequency signal, (ii) a geometric distance metric between the second radio-frequency signal and the simulated radio-frequency signal, (iii) a measure of probability distribution between second radio-frequency signal and the simulated radio frequency signal, or (iv) a measure of distance between characterizing the second radio-frequency signal and the simulated radio-frequency signal.

In some implementations, the second measure of distance includes at least one of (i) a cross-entropy between the second information and the first information, (ii) a geometric distance metric between the second information and the first information, or (iii) a measure of accuracy of one or more of the reconstructed bits, code words, or messages of the first information from the second information.

In some implementations, updating the encoder machine-learning network, includes updating at least one encoding network weight or network connectivity in one or more layers of the encoder machine-learning network, updating the decoder machine-learning network includes updating at least one decoding network weight or network connectivity in one or more layers of the decoder machine-learning network, and updating the channel machine-learning network includes updating at least one network weight or network connectivity in one or more layers of the channel machine-learning network.

In some implementations, the method further includes: processing the first radio-frequency signal to generate a first analog radio-frequency waveform that is input into the first communication channel; receiving a second analog radio-frequency waveform as an output of the first communication channel that represents the first analog radio-frequency waveform having been altered by the first communication channel; and processing the second analog radio-frequency waveform to generate the second radio-frequency signal.

In some implementations, the first communication channel includes at least one of a radio communication channel, an acoustic communication channel, or an optical communication channel.

In another aspect, a method includes: transmitting input information through a first communication channel; obtaining first information as an output of the first communication channel; transmitting the input information through a second communication channel implementing a channel machine-learning network, the second communication channel representing a model of the first communication channel; obtaining second information as an output of the second communication channel; providing the first information or the second information to a discriminator machine-learning network as an input; obtaining an output of the discriminator machine-learning network; and updating the channel machine-learning network using the output of the discriminator machine-learning network.

In some implementations, the output of the discriminator machine-learning network indicates a decision by the discriminator machine-learning network whether the input provided to the discriminator machine-learning network was the output of the first communication channel or the second communication channel.

In some implementations, the output of the discriminator machine-learning network is a binary output.

In some implementations, the output of the discriminator machine-learning network indicates a degree of similarity between the first communication channel and the second communication channel.

In some implementations, the channel machine-learning network includes one or more variational layers or neurons containing a random sampling operation using at least one of inputs or weights to define a particular aspect of a probability distribution.

In some implementations, the channel machine-learning network is conditioned on the input information.

In some implementations, the channel machine-learning network is conditioned on one or more locations of one or more radios transceiving the first radio-frequency signal or the second radio-frequency signal.

In another aspect, a system includes: at least one processor; and at least one computer memory coupled to the at least one processor having stored thereon instructions which, when executed by the at least one processor, cause the at least one processor to perform operations includes: obtaining first information; using an encoder machine-learning network to process the first information and generate a first radio-frequency signal; transmitting the first radio-frequency signal through a first communication channel; determining a second radio-frequency signal that represents the first radio-frequency signal having been altered by transmission through the first communication channel; simulating transmission of the first radio-frequency signal over a second communication channel implementing a channel machine-learning network, the second communication channel representing a model of the first communication channel; determining a simulated radio-frequency signal that represents the first radio-frequency signal having been altered by simulated transmission through the second communication channel; calculating a first measure of distance between the second radio-frequency signal and the simulated radio-frequency signal; and updating the channel machine-learning network using the first measure of distance.

In some implementations, the operations further include: using a decoder machine-learning network to process the simulated radio-frequency signal and generate second information that is a reconstruction of the first information; calculating a second measure of distance between the second information and the first information; and updating at least one of the encoder machine-learning network or the decoder machine-learning network using the second measure of distance.

In some implementations, the operations further include: calculating a combined distance using the first measure of distance and the second measure of distance; and updating at least one of the encoder machine-learning network, the decoder machine-learning network, or the channel machine-learning network using the combined distance.

In some implementations, the encoder machine-learning network, the decoder machine-learning network, and the channel machine-learning network of the approximated channel are updated concurrently.

In some implementations, the encoder machine-learning network or the decoder machine-learning network, and the channel machine-learning network are updated iteratively.

In some implementations, updating the channel machine-learning network includes: inserting a reference tone into the first radio-frequency signal at an offset time; determining a time at which the first radio-frequency signal has passed through the first communication channel; using the reference tone and the time at which the first radio-frequency signal has passed through the first communication channel to determine at least one of timing or frequency of the first radio-frequency signal; receiving the second radio-frequency signal; and using the timing or frequency of the first radio-frequency signal to remove alignment errors from the second radio-frequency signal.

In some implementations, updating the channel machine-learning network includes: using a digital to analog converter to process the first radio-frequency signal, where the digital to analog converter receives a signal from a time source; using an analog to digital converter to produce the second radio-frequency signal, where the analog to digital converter receives a signal from the time source; and using a known timing of the time source to align the second radio-frequency signal with the first radio-frequency signal.

In some implementations, at least one of the encoder machine-learning network, the decoder machine-learning network, or the channel machine-learning network of the approximated channel includes one of a dense neural network (DNN), a convolutional neural network (CNN), or a recurrent neural network (RNN) includes parametric multiplications, additions, and non-linearities.

In some implementations, the first measure of distance includes at least one of (i) a cross-entropy between the second radio-frequency signal and the simulated radio-frequency signal, (ii) a geometric distance metric between the second radio-frequency signal and the simulated radio-frequency signal, (iii) a measure of probability distribution between second radio-frequency signal and the simulated radio frequency signal, or (iv) a measure of distance between characterizing the second radio-frequency signal and the simulated radio-frequency signal.

In some implementations, the second measure of distance includes at least one of (i) a cross-entropy between the second information and the first information, (ii) a geometric distance metric between the second information and the first information, or (iii) a measure of accuracy of one or more of the reconstructed bits, code words, or messages of the first information from the second information.

In some implementations, updating the encoder machine-learning network, includes updating at least one encoding network weight or network connectivity in one or more layers of the encoder machine-learning network, updating the decoder machine-learning network includes updating at least one decoding network weight or network connectivity in one or more layers of the decoder machine-learning network, and updating the channel machine-learning network includes updating at least one network weight or network connectivity in one or more layers of the channel machine-learning network.

In some implementations, the operations further include: processing the first radio-frequency signal to generate a first analog radio-frequency waveform that is input into the first communication channel; receiving a second analog radio-frequency waveform as an output of the first communication channel that represents the first analog radio-frequency waveform having been altered by the first communication channel; and processing the second analog radio-frequency waveform to generate the second radio-frequency signal.

In some implementations, the first communication channel includes at least one of a radio communication channel, an acoustic communication channel, or an optical communication channel.

In another aspect, a system includes: at least one processor; and at least one computer memory coupled to the at least one processor having stored thereon instructions which, when executed by the at least one processor, cause the at least one processor to perform operations includes: transmitting input information through a first communication channel; obtaining first information as an output of the first communication channel; transmitting the input information through a second communication channel implementing a channel machine-learning network, the second communication channel representing a model of the first communication channel; obtaining second information as an output of the second communication channel; providing the first information or the second information to a discriminator machine-learning network as an input; obtaining an output of the discriminator machine-learning network; and updating the channel machine-learning network using the output of the discriminator machine-learning network.

In some implementations, the output of the discriminator machine-learning network indicates a decision by the discriminator machine-learning network whether the input provided to the discriminator machine-learning network was the output of the first communication channel or the second communication channel.

In some implementations, the output of the discriminator machine-learning network is a binary output.

In some implementations, the output of the discriminator machine-learning network indicates a degree of similarity between the first communication channel and the second communication channel.

In some implementations, the channel machine-learning network includes one or more variational layers or neurons containing a random sampling operation using at least one of inputs or weights to define a particular aspect of a probability distribution.

In some implementations, the channel machine-learning network is conditioned on the input information.

In some implementations, the channel machine-learning network is conditioned on one or more locations of one or more radios transceiving the first radio-frequency signal or the second radio-frequency signal.

In another aspect, one or more non-transitory computer-readable media, storing a computer program, the program includes instructions that when executed by one or more processing devices cause the one or more processing devices to perform operations includes: obtaining first information; using an encoder machine-learning network to process the first information and generate a first radio-frequency signal; transmitting the first radio-frequency signal through a first communication channel; determining a second radio-frequency signal that represents the first radio-frequency signal having been altered by transmission through the first communication channel; simulating transmission of the first radio-frequency signal over a second communication channel implementing a channel machine-learning network, the second communication channel representing a model of the first communication channel; determining a simulated radio-frequency signal that represents the first radio-frequency signal having been altered by simulated transmission through the second communication channel; calculating a first measure of distance between the second radio-frequency signal and the simulated radio-frequency signal; and updating the channel machine-learning network using the first measure of distance.

In some implementations, the operations further include: using a decoder machine-learning network to process the simulated radio-frequency signal and generate second information that is a reconstruction of the first information; calculating a second measure of distance between the second information and the first information; and updating at least one of the encoder machine-learning network or the decoder machine-learning network using the second measure of distance.

In some implementations, the operations further include: calculating a combined distance using the first measure of distance and the second measure of distance; and updating at least one of the encoder machine-learning network, the decoder machine-learning network, or the channel machine-learning network using the combined distance.

In some implementations, the encoder machine-learning network, the decoder machine-learning network, and the channel machine-learning network of the approximated channel are updated concurrently.

In some implementations, the encoder machine-learning network or the decoder machine-learning network, and the channel machine-learning network are updated iteratively.

In some implementations, updating the channel machine-learning network includes: inserting a reference tone into the first radio-frequency signal at an offset time; determining a time at which the first radio-frequency signal has passed through the first communication channel; using the reference tone and the time at which the first radio-frequency signal has passed through the first communication channel to determine at least one of timing or frequency of the first radio-frequency signal; receiving the second radio-frequency signal; and using the timing or frequency of the first radio-frequency signal to remove alignment errors from the second radio-frequency signal.

In some implementations, updating the channel machine-learning network includes: using a digital to analog converter to process the first radio-frequency signal, where the digital to analog converter receives a signal from a time source; using an analog to digital converter to produce the second radio-frequency signal, where the analog to digital converter receives a signal from the time source; and using a known timing of the time source to align the second radio-frequency signal with the first radio-frequency signal.

In some implementations, at least one of the encoder machine-learning network, the decoder machine-learning network, or the channel machine-learning network of the approximated channel includes one of a dense neural network (DNN), a convolutional neural network (CNN), or a recurrent neural network (RNN) includes parametric multiplications, additions, and non-linearities.

In some implementations, the first measure of distance includes at least one of (i) a cross-entropy between the second radio-frequency signal and the simulated radio-frequency signal, (ii) a geometric distance metric between the second radio-frequency signal and the simulated radio-frequency signal, (iii) a measure of probability distribution between second radio-frequency signal and the simulated radio frequency signal, or (iv) a measure of distance between characterizing the second radio-frequency signal and the simulated radio-frequency signal.

In some implementations, the second measure of distance includes at least one of (i) a cross-entropy between the second information and the first information, (ii) a geometric distance metric between the second information and the first information, or (iii) a measure of accuracy of one or more of the reconstructed bits, code words, or messages of the first information from the second information.

In some implementations, updating the encoder machine-learning network, includes updating at least one encoding network weight or network connectivity in one or more layers of the encoder machine-learning network, updating the decoder machine-learning network includes updating at least one decoding network weight or network connectivity in one or more layers of the decoder machine-learning network, and updating the channel machine-learning network includes updating at least one network weight or network connectivity in one or more layers of the channel machine-learning network.

In some implementations, the operations further include: processing the first radio-frequency signal to generate a first analog radio-frequency waveform that is input into the first communication channel; receiving a second analog radio-frequency waveform as an output of the first communication channel that represents the first analog radio-frequency waveform having been altered by the first communication channel; and processing the second analog radio-frequency waveform to generate the second radio-frequency signal.

In some implementations, the first communication channel includes at least one of a radio communication channel, an acoustic communication channel, or an optical communication channel.

In another aspect, one or more non-transitory computer-readable media, storing a computer program, the program includes instructions that when executed by one or more processing devices cause the one or more processing devices to perform operations includes: transmitting input information through a first communication channel; obtaining first information as an output of the first communication channel; transmitting the input information through a second communication channel implementing a channel machine-learning network, the second communication channel representing a model of the first communication channel; obtaining second information as an output of the second communication channel; providing the first information or the second information to a discriminator machine-learning network as an input; obtaining an output of the discriminator machine-learning network; and updating the channel machine-learning network using the output of the discriminator machine-learning network.

In some implementations, the output of the discriminator machine-learning network indicates a decision by the discriminator machine-learning network whether the input provided to the discriminator machine-learning network was the output of the first communication channel or the second communication channel.

In some implementations, the output of the discriminator machine-learning network is a binary output.

In some implementations, the output of the discriminator machine-learning network indicates a degree of similarity between the first communication channel and the second communication channel.

In some implementations, the channel machine-learning network includes one or more variational layers or neurons containing a random sampling operation using at least one of inputs or weights to define a particular aspect of a probability distribution.

In some implementations, the channel machine-learning network is conditioned on the input information.

In some implementations, the channel machine-learning network is conditioned on one or more locations of one or more radios transceiving the first radio-frequency signal or the second radio-frequency signal.

Other implementations of these and other aspects include corresponding systems, apparatuses, and computer programs, configured to perform the actions of the methods, encoded on computer storage devices. A system of one or more computers can be so configured by virtue of software, firmware, hardware, or a combination of them installed on the system that in operation cause the system to perform the actions. One or more computer programs can be so configured by virtue of having instructions that, when executed by data processing apparatus, cause the apparatus to perform the actions.

All or part of the features described throughout this application can be implemented as a computer program product including instructions that are stored on one or more non-transitory machine-readable storage media, and that are executable on one or more processing devices. All or part of the features described throughout this application can be implemented as an apparatus, method, or electronic system that can include one or more processing devices and memory to store executable instructions to implement the stated functions.

The techniques described herein can be implemented to achieve one or more of the following improvements and advantages. For example, by optimizing the objectives of an approximated communications channel and information encoding for the approximated communications channel, the disclosed system enables the design of communications systems that can account for specific hardware devices, channel types, channel impairments, or other constraints, which are traditionally hard to model (or result in suboptimal performance when making simplifying assumptions about the channel effects) or which may vary widely depending on hardware and environmental factors upon deployment.

In addition, by using a machine-learning network, such as a parametric network, for function approximation and a wide variety of linear, non-linear, and difficult-to-model communications channel impairment effects, the communications channel can be approximated, updated and modeled rapidly without compromising the validity of the channel model by attempting to simplify it.

Also, by enabling the encoder and decoder machine-learning networks with high degrees of freedom to arbitrarily mix information and learn near-optimal encoding representations and inference processes driven principally, for example, by a high-level loss or objective function, the disclosed system allows for a highly efficient communication system designs, which outperform traditional solutions to many radio-frequency (RF) communications and encoding problems. This performance advantage can be attributed in some instances to better optimization for real operating conditions and effects of the wireless channel and radio hardware, as well as to the multi-function optimization and compact inference learning within the radio modem, for instance jointly learning to optimize and transform information to account for hardware non-linearity, modulation, error correction, equalization, and symbol detection within compact joint machine learning encoding and/or decoding networks for inference.

The details of one or more implementations of the subject matter of this disclosure are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
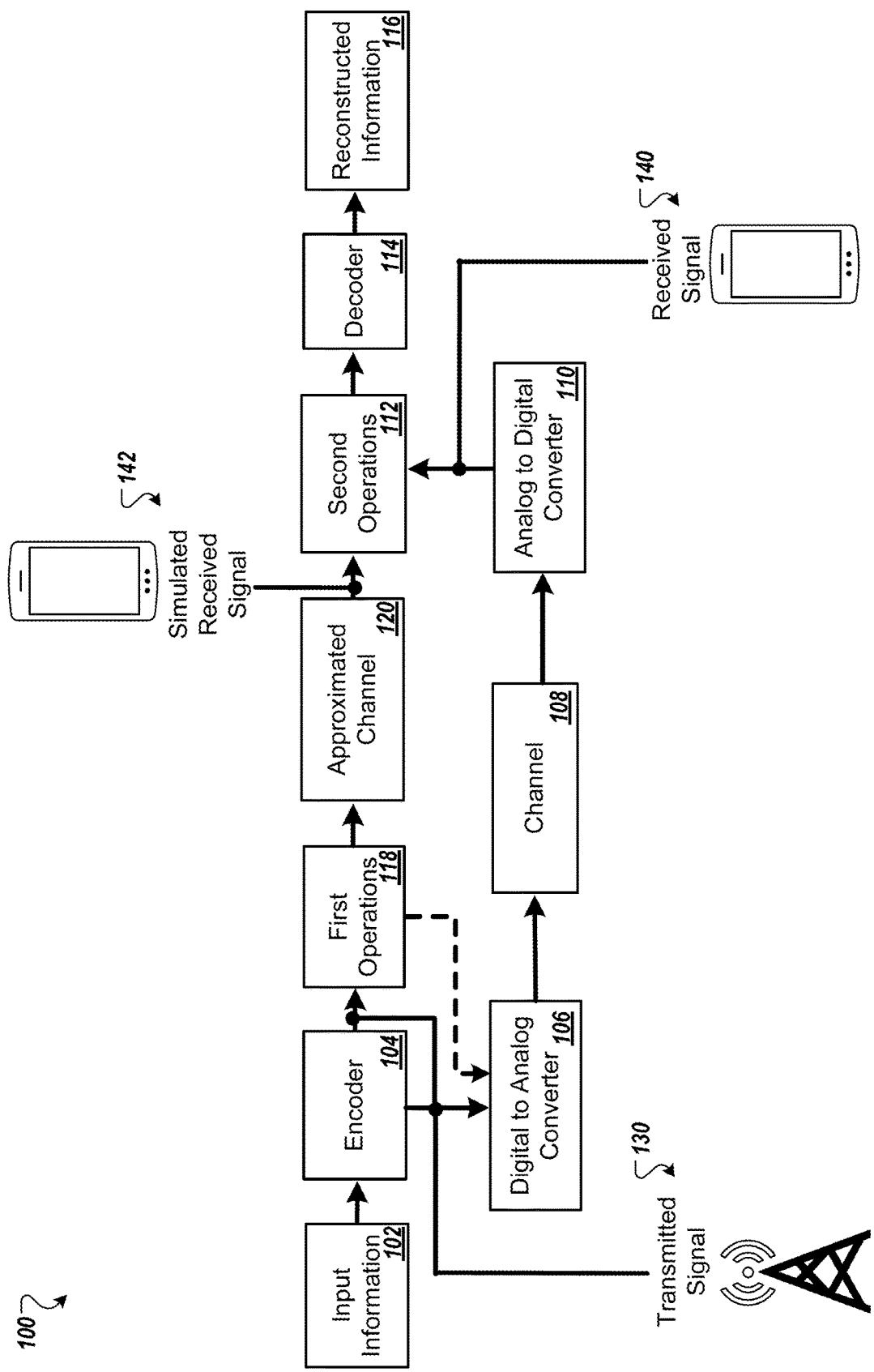
FIG. 1 illustrates an example of a radio-frequency (RF) communications system that implements a machine-learning encoder and decoder, and an approximated communication channel having a machine-learning network to perform learned communication over a real-world RF channel.

Systems and techniques are disclosed herein that enable adversarial machine learning and deployment of communication over an impaired radio-frequency (RF) channel. In some implementations, the system includes an encoder machine learning network and/or a decoder machine-learning network, and an approximated communications channel implementing a channel machine-learning network. The channel machine-learning network may be trained to approximate a particular real-world communications channel. The channel machine-learning network training may be designed to account for a wide variety of linear, non-linear, and difficult-to-model communications channel impairment effects. The encoder machine-learning network and/or decoder machine-learning network may be trained to encode information as a signal that is transmitted over a radio transmission channel, and decode a received signal to recover the original information. The training of the encoder machine-learning network and/or decoder machine-learning network may be designed to achieve various criteria, such a low bit error rate, low power, low bandwidth, low complexity, particular spectral or signal properties, performing well in particular regimes such as at a low signal to noise (SNR) ratio or under specific types of channel fading or interference, and/or other criteria.

The machine-learning networks of the system may be trained adversarially, e.g., adversarially optimized, such that the objective functions of the encoder machine-learning network and/or the decoder machine-learning network compete with (or differ from) the objective function of the channel machine-learning network. In some implementations, training the machine-learning networks includes adversarially optimizing the encoder machine-learning network and/or the decoder machine-learning network iteratively with the channel machine-learning network. In some implementations, training the machine-learning networks includes adversarially optimizing the encoder machine-learning network and/or the decoder machine-learning network jointly with the channel machine-learning network.

In some implementations, the system includes a discriminator machine-learning network and an approximated communication channel implementing a channel machine-learning network. The channel machine-learning network may be trained to approximate a particular real-world communications channel. The channel machine-learning network training may be designed to account for a wide variety of linear, non-linear, and difficult-to-model communications channel impairment effects. In some implementations, the channel machine-learning network is a variational generator network. The discriminator machine-learning network may be trained to accurately distinguish between the output of a real-world communication channel and the approximated communication channel. Likewise, the discriminator and the gradients therefrom may be used to update the channel machine learning network, e.g., to make it more similar to the real-world communications channel outputs.

The results of training such machine-learning networks may then be utilized to deploy real-world encoders and decoders in communication scenarios to encode and decode information over various types of RF communication media. In some implementations, further learning and adaptation of the encoder and/or decoder is implemented during deployment. This may leverage known transmissions such as reference signals, decision feedback, or may be based on feedback information. These encoders and decoders may replace or augment one or more signal processing functions such as modulation, demodulation, estimation, equalization, mapping, error correction, or other components which exist in those systems today.

The results of training the channel machine-learning network may then be utilized to predict a channel response which may depend on input values, input locations or other parameters. The predicted response can be used to determine RF coverage or expected receive signal strength for a particular area. The predicted response could also be used for planning deployments, such as location candidates for a cell towers, antennas, remote radio heads, antenna arrays or other radios system components.

The disclosed implementations present a novel approach to how digital radio systems are designed, updated and deployed for radio communications applications. For example, the disclosed implementations may help improve a typically slow and incremental process of radio signal processing engineering, and instead enable a new way of designing, constructing, and realizing radio communications systems. By implementing machine-learning networks that may be trained to approximate a real-world channel and learn suitable encoding and decoding techniques for different types of communication media, techniques disclosed herein offer various advantages, such as improved throughput, power, resiliency, and complexity advantages over presently available systems. In some scenarios, this can be especially important for communications channels which have one or more effects which are hard to model, or hard to optimize for using other approaches.

Implementations disclosed herein may be applied to a wide range of radio communication systems, such as cellular, satellite, optical, acoustic, physical, emergency handheld, broadcast, point-to-point, mesh, Wi-Fi, Bluetooth, and other forms of radio that undergo transmission impairments. Channel impairments may include, for example, thermal noise, such as Gaussian-like noise, to more complex impairments such as multi-path fading, impulse noise, spurious or continuous jamming, interference, distortion, intermodulation, compression, impedance mismatch, hardware effects, and other impairments.

The encoder and decoder may implement encoding and decoding techniques that are learned from one or more machine-learning networks that have been trained to learn suitable input-output encoding and decoding mappings based on one or more objective criteria. For example, the machine-learning networks may be artificial neural networks. During training, the machine-learning networks may be adapted through selection of model architecture, weights, and parameters in the encoder and/or the decoder to learn encoding and decoding mappings. The encoding and decoding machine-learning networks may be trained jointly or may be trained iteratively.

For example, an encoder machine-learning network (also referred to as "encoder network") and decoder machine-learning network (also referred to as "decoder network") may be implemented as an autoencoder, in which the encoder network and decoder network are jointly optimized. In some implementations, the autoencoder is trained by modeling the effects of an impaired channel as one or more channel-modeling layers, such as stochastic layers which may include regularization layers (e.g. regularization layers, transforming layers, variational layers/samplers, noise layers, mixing layers, etc.) in the autoencoder network or as another set of differentiable functions representing the behavior of a wireless channel. The layers that model the channel may form a regularization function across random behavior of a channel. In some implementations, an autoencoder is used to learn encoder and/or decoder networks while using a channel machine-learning network such as a variational network as a representation of the channel impairments and effects.

During training, an encoder machine-learning network and decoder machine-learning network may be trained to perform unsupervised, or partially supervised, machine learning to determine techniques for transmitting and receiving information over an impaired channel. Similarly, an approximated channel machine-learning network may be trained to perform unsupervised, or partially supervised, machine learning to accurately emulate a particular real-world network. Similarly, a discriminator machine-learning network may be trained to perform unsupervised, or partially supervised, machine learning to accurately distinguish signals outputted (e.g., measured) from a real-world channel and those outputted from an approximated channel having a machine-learning network. Therefore, in some scenarios, rather than being reliant upon pre-designed systems for error correction, modulation, pre☐coding, pre-distortion, pre-coding, shaping, or other modem functions, the disclosed implementations herein may adaptively learn techniques for encoding information into waveforms that are transmitted over a channel, as well as techniques for decoding received waveforms into reconstructed information. One or more of the networks can be trained on real or simulated channel conditions. In this context, a real channel refers to a physical communication channel (e.g., a wireless channel, a wired channel, or a combination of both) in the real world over which actual RF communication takes place. In contrast, a simulated channel refers to a model of a real channel that models the characteristics and effects of a corresponding real channel, and that is realized using software modeling or hardware modeling, or a combination of the two. One or more of the networks that utilize results of training such machine-learning networks may further be updated during deployment, thus providing advantages in adapting to different types of wireless system requirements, and in some cases improving the throughput, error rate, complexity, and power consumption performance of such systems.

As such, regardless of the type of RF channel or RF channel impairment, implementations disclosed herein can provide broadly applicable techniques for learning representations of information that enable reliable communication over impaired RF channels. Depending on the configuration of the training system and data sets and channel models used, such machine-learning communication techniques can specialize in performance for a narrow class of conditions, signal or channel types, or may generalize and optimize performance for a wide range of signal or channel types or mixtures of one or more signals or channels.

In addition, by optimizing the objectives of an approximated communications channel and information encoding for the approximated communications channel, the disclosed system enables the design of communications systems that can account for specific hardware devices, channel types, channel impairments, or other constraints, which are traditionally hard to model (or result in sub-optimal performance when making simplifying assumptions about the channel effects).

In addition, by using a machine-learning network, such as a parametric network, for function approximation and a wide variety of linear, non-linear, and difficult-to-model communications channel impairment effects, the communications channel can be approximated and modeled rapidly without compromising the validity of the channel model by attempting to simplify it. By leveraging variational networks, arbitrary stochastic effects over the channel model may be modeled as well.

Also, by enabling the encoder and decoder machine-learning networks with high degrees of freedom to arbitrarily mix information and learn near-optimal encoding representations driven principally, for example, by a high-level loss function, the disclosed system allows for a highly efficient communication system designs, which outperform traditional solutions to many radio-frequency (RF) communications and encoding problems.

FIG. 1 illustrates an example of a radio-frequency communications system 100 that includes a machine-learning encoder 104 and a machine-learning decoder 114, and an approximated communication channel 120 having a machine-learning network ("channel network") to perform learned communication over a real-world RF channel 108. The system 100 also includes a digital to analog converter 106 and an analog to digital converter 110. The encoder 104 and the decoder 114 implement encoding and decoding techniques that are learned by the machine learning networks to communicate over the real-world RF channel 108. The machine-learning network of the approximated communications channel 120 is taught to approximate the real-world RF channel 108.

Channel 108 may include a single wireless transmission channel. Channel 108 may include multiple wireless transmission channels. Channel 108 may include various analog radio components such as amplifiers, mixers, etc. Channel 108 may include a combination of various analog radio components and one or more wireless transmission channels. As an example, channel 108 may be a wireless local area network (WLAN) channel, a Wi-Fi channel, a Bluetooth channel, a cellular network channel (e.g., one implementing GSM or UMTS technology), etc.

First operations 118 may include a series of pre-processing operations and/or normalization steps that is performed on the transmitted signal 130. In some implementations, first operations 118 are not performed on the transmitted signal 130. In some implementations, first operations 118 are employed by the encoder 104 or are otherwise part of encoder 104.

Second operations 112 may include a series of pre-processing operations and/or normalization steps that is performed on the received signal 140 or the simulated received signal 142. In some implementations, second operations 112 are not performed on the received signal 140 or the simulated received signal 142. In some implementations, second operations 112 are employed by the decoder 114 or are otherwise part of decoder 114.

The first operations 118 and the second operations 112 may include signal detection, synchronization, orthogonal frequency-division multiplexing (OFDM) or other modulation, framing, resource block assignment or extraction, normalization, filtering, tuning, etc. in order to, for example, account for noise, a limited bandwidth of a channel (e.g., channel 108), inconsistencies, etc. First operations 118 and second operations 112 may be realized as digital signal processor (DSP) routines. First operations 118 and second operations 112 may involve additional neural network based pre-processing tasks.

In scenarios of training, the encoder 104 includes a machine-learning network ("encoder network") that learns how to represent the input information 102 as a transmitted signal 130 for transmission over the channel 108. Analogously, during training, the decoder 114 includes a machine-learning network ("decoder network") that learns how to decode a received signal 140 after it has been modified by second operations 112 into reconstructed information 116 that approximates the original input information 102. During training, the approximated channel 120 includes a machine-learning network that learns to simulate channel 108. That is, the channel network models the impairments which occur to a radio signal sent over a channel (e.g., channel 108) based on analog hardware components and/or radio propagation effects of the channel (and other ancillary hardware components used in RF signal transmission and reception). The encoder 104 and decoder 114 may be trained to achieve various types of objective functions, such as a measure of reconstruction error, a measure of computational complexity, bandwidth, latency, power, or various combinations therefor and other objectives. Further details of training are described below, for example with reference to FIG. 2.

In scenarios of approximated channel 120 training and encoder 104 and/or decoder 114 deployment, the channel machine-learning network of the approximated channel 120 is trained when the lower path shown in FIG. 1 is followed, i.e., when: (i) input information 102 is passed through the encoder 104; (ii) the encoder 104 produces the transmitted signal 130; (iii) the transmitted signal 130 is passed through the digital to analog converter 106; (iv) the converted transmitted signal 130 is then transmitted across channel 108 and altered as a result of being transmitted across channel 108; (v) the altered signal is then passed through an analog to digital converter 110, producing the received signal 140; (vi) the received signal 140 is modified by second operations 112; (vii) the modified received signal is passed through the decoder 114; and (viii) the decoder 114 produces reconstructed information 114 that is an attempted reproduction of the input information 102. During approximated channel training and encoder 104 and/or decoder 114 deployment, and as described in more detail with respect to FIG. 2, the transmitted signal 130 and the received signal 140 are used to update the channel machine-learning network of the approximated channel 120.

In other implementations (as shown by the dotted line), in scenarios of approximated channel 120 training and encoder 104 and/or decoder 114 deployment, the channel machine-learning network of the approximated channel 120 is trained when: (i) input information 102 is passed through the encoder 104; (ii) the output signal of the encoder 104 is sent to first operations 118 (e.g., an OFDM modulator); (iii) the first operations 118 produce the transmitted signal 130; (iv) the transmitted signal 130 is passed through the digital to analog converter 106; (v) the converted transmitted signal 130 is then transmitted across channel 108 and altered as a result of being transmitted across channel 108; (vi) the altered signal is then passed through an analog to digital converter 110, producing the received signal 140; (vii) the received signal 140 is modified by second operations 112; (viii) the modified received signal is passed through the decoder 114; and (ix) the decoder 114 produces reconstructed information 114 that is an attempted reproduction of the input information 102. During approximated channel training and encoder 104 and/or decoder 114 deployment, and as will be described in more detail with respect to FIG. 2, the transmitted signal 130 and the received signal 140 are used to update the channel machine-learning network of the approximated channel 120.

During approximated channel 120 training and encoder 104 and/or decoder 114 deployment, the encoder 104 and decoder 114 may implement encoding and decoding techniques that were previously learned from training, or may be (further) trained during deployment. The encoder 104 and decoder 114 may be deployed in various application scenarios to perform communication, using the encoding and decoding representations that were learned during training. In some implementations, the encoder 104 and/or decoder 114 is further updated during deployment based on real-time performance results such as reconstruction error, power consumption, traffic loading, propagation characteristics, delay, etc. Further details of deployment are described below, for example with reference to FIG. 2. In these cases, error feedback of loss functions or updated model parameters may occur in some instances via a communications bus, or a protocol message within the wireless system which can be used to update the encoder 104 and/or decoder 114, along with information to help characterize the response of the channel 108.

In scenarios of approximated channel 120 deployment and encoder 104 and/or decoder 114 training, the approximated channel 120 is deployed when the upper path shown in FIG. 1 is followed, i.e., when: (i) input information 102 is passed through the encoder 104; (ii) the encoder 104 produces the transmitted signal 130; (iii) the transmitted signal 130 is modified by first operations 118; (iv) simulated transmission of the modified transmitted signal over the approximated channel 120 is performed, producing the simulated received signal 142; (vi) the simulated received signal 142 is modified by second operations 112; (vii) the modified, simulated received signal is passed through the decoder 114; and (viii) the decoder 114 produces reconstructed information 114 that is an attempted reproduction of the input information 102. During deployment, the approximated channel 120 is used to compute a gradient of a loss or distance function between the input information 102 and the reconstructed information 116. This gradient can be used to update the machine-learning networks of the encoder 104 and decoder 114 by, for example, back propagating parameters in those networks. In some implementations, the channel machine-learning network of the approximated channel 120 is further trained during deployment. Further details of deployment are described below, for example with reference to FIG. 2.

The input information 102 and reconstructed information 116 may be any suitable form of information that is to be communicated over a channel, such as a stream of bits, packets, discrete-time signals, or continuous-time waveforms. Implementations disclosed herein are not limited to any particular type of input information 102 and reconstructed information 116, and are generally applicable to learn encoding and decoding techniques for communicating a wide variety of types of information over the RF channel 108.

In some implementations, the encoder 104 and decoder 114 employ one or more signal processing operations, which are suited to the type of RF communication domain. As examples, the encoder 104 and/or decoder 114 may implement filtering, modulation, analog-to-digital (A/D) or digital-to-analog (D/A) conversion, equalization, or other signal processing methods that may be suitable for a particular types of RF signals or communication domains. In some implementations, the encoder 104 and/or decoder 114 implement one or more transmit and receive antennas, and other hardware or software suitable for transmitting signals 130 and receiving signals 140 over the RF channel 108, such as, for example, a set of analog components with multiple inputs and multiple outputs (MIMO). As such, the full system described herein along with the training process is directly applicable to MIMO and massive MIMO systems, such as for candidate cellular fifth generation (5G), 5G+, sixth generation (6G), or 6G+, waveform design, and optimization and deployment of various communications systems.

Therefore, in such scenarios, as shown in the example of FIG. 1, the transmitted signal 130 and received signal 140 may represent actual RF waveforms that are transmitted and received over the RF channel 108 through one or more antennas. Thus, the encoder 104 and decoder 114 may represent generalized mappings between input information 102 and reconstructed information 116, and the transmitted signal 130 and the received signal 140.

By contrast, in some implementations, the system 100 implements signal processing and RF transmission/reception processes separately from the encoder 104 and decoder 114. In such implementations, one or more signal transmission and/or signal reception components, such as filtering, modulation, A/D or D/A conversion, single or multiple antennas, etc., may be represented as part of the channel 108. The impairments in the channel 108 accordingly may include transmitter/receiver effects, such as filtering impairments, additive noise, or other impairments in the transmitter and/or receiver components. Therefore, in such scenarios, the transmitted signal 130 and received signal 140 represent intermediate representations of input information 102 and reconstructed information 116, and the channel 108 represents a general transformation of those intermediate representations of information to and from actual RF waveforms that are transmitted and received over an RF medium. For example, the transmitted signal 130 and received signal 140 may represent basis coefficients for RF waveforms, time-domain samples of RF waveforms, distributions over RF waveform values, or other intermediate representations that may be transformed to and from RF waveforms.

In scenarios of approximated channel training and encoder 104 and/or decoder 114 deployment, the transmitted signal 130 may be compared with the received signal 140, and the channel machine-learning network of the approximated channel may be trained (updated) based on results of the comparison. In some implementations, updating the channel machine-learning network of the approximated channel 120 is also based on other factors, such as computational complexity of the machine-learning networks (which can be measured, for example, by the number of parameters, number of multiplies/adds, execution time, Kolmogorov complexity, or otherwise), historical information such as previous inputs and outputs or channel states, transmission bandwidth or power used to communicate over the channel 108, or various combinations thereof and other metrics.

In scenarios of approximated channel deployment and encoder 104 and/or decoder 114 training, the reconstructed information 116 may be compared with the input information 102, and the encoder 104 and/or the decoder 114 may be trained (updated) based on results of the comparison. In some implementations, updating the encoder 104 and/or decoder 114 is also based on other factors, such as computational complexity of the machine-learning networks (which can be measured, for example, by the number of parameters, number of multiplies/adds, execution time, Kolmogorov complexity, or otherwise), historical information such as previous inputs and outputs or channel states, transmission bandwidth or power used to communicate over the channel 108, or various combinations thereof and other metrics.

Figure 2:
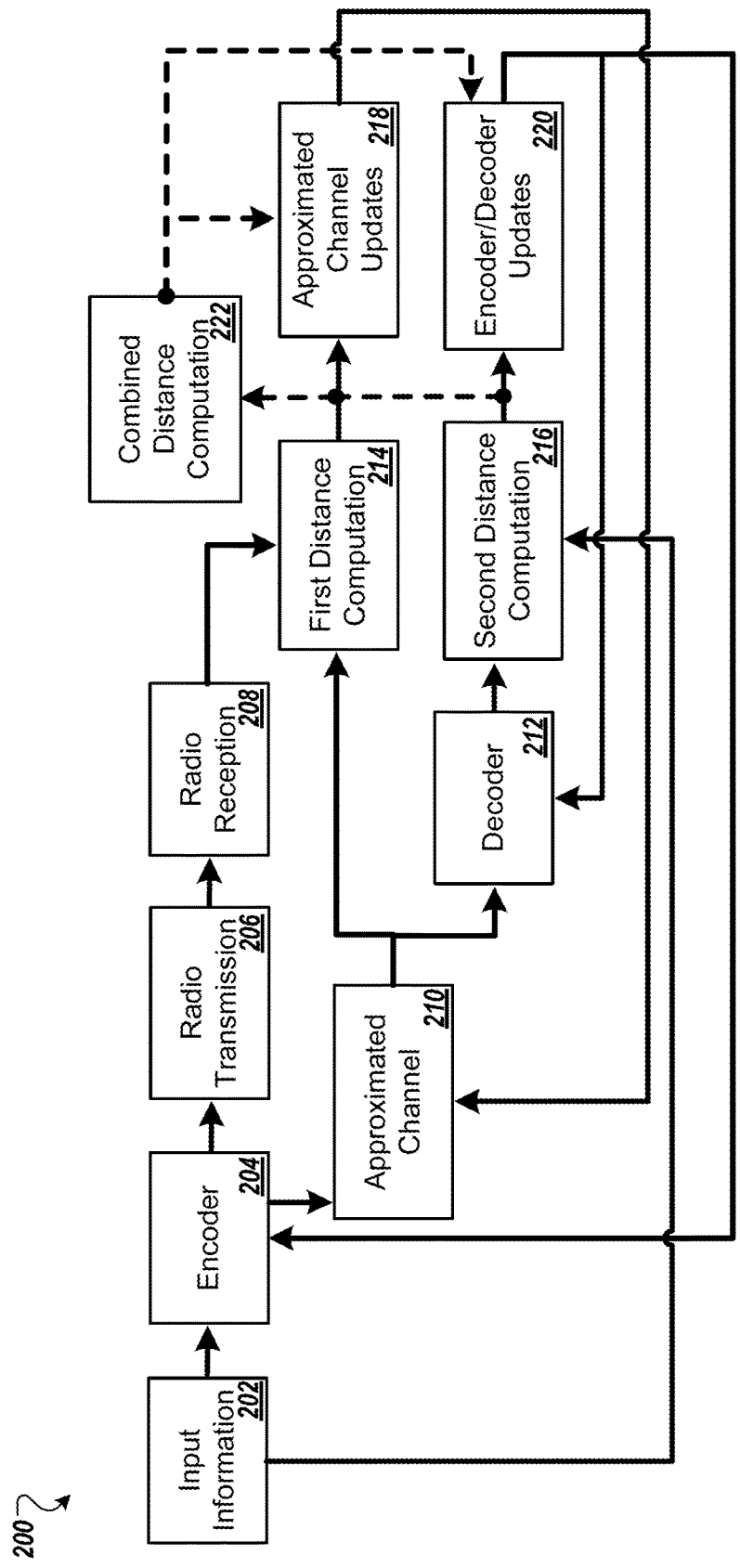
FIG. 2 illustrates an example of adversarially training an RF system that implements machine-learning encoder and decoder networks to learn encoding and decoding over RF channels, and implements an approximated communication channel having a machine-learning network.

As described in more detail with respect to FIG. 2, in some implementations, the channel machine-learning network of the approximated channel 120, and the encoder 104 and/or decoder 114 networks are jointly trained.

As described in more detail with respect to FIG. 2, in some implementations, the channel machine-learning network of the approximated channel 120, and the encoder 104 and/or decoder 114 networks are iteratively trained. When iteratively trained, the networks may be updated in an iterative process such as such as stochastic gradient descent (SGD) or through some other means.

In some implementations, the approximated channel 120, the encoder 104, and the decoder 114 include artificial neural networks that consist of one or more connected layers of parametric multiplications, divisions, summations, and non-linearities (such as rectified linear units or sigmoid functions). In such scenarios, updating the approximated channel 120, the encoder 104, and/or decoder 114 may include updating weights of the neural network layers, or updating connectivity in the neural network layers, or other modifications of the neural network architecture, so as to modify a mapping of inputs to outputs.

The encoder 104 and decoder 114 networks may be implemented using a neural network structure that is configured as an autoencoder. In the scenario of an autoencoder structure, the encoder 104 and decoder 114 are jointly trained to learn best representations of information for communication over the channel 108. In general, however, the encoder and decoder networks may be configured as separate networks in an encoder network and a decoder network, which may be jointly or iteratively trained. During training, the encoder network and/or decoder network may be updated by a network update process.

In general, the channel machine-learning network (also referred to as "channel network"), the encoder network, and/or decoder network may include one or more collections of multiplications, divisions, and summations or other operations of inputs and intermediate values, optionally followed by non-linearities (such as rectified linear units, sigmoid function, or otherwise) or other operations (e.g., normalization), which may be arranged in a feed-forward manner or in a manner with feedback and in-layer connections (e.g., a recurrent neural network (RNN) where sequences of training information may be used in some instances). For example, a recurrent neural network may be a long-short term memory (LSTM) neural network that includes one or more LSTM memory blocks, or a quasi-recurrent neural network (QRNN) which combines elements of convolutional networks with recurrent networks.

Parameters and weight values in the networks may be used for a single multiplication, as in a fully connected dense neural network (DNN), or they may be "tied" or replicated across multiple locations within the network to form one or more receptive fields, such as in a convolutional neural network (CNN), a dilated convolutional neural network, a residual network unit, or similar. A collection of one or more of layers of a network may constitute both the encoder 104 and the decoder 114. The specific structure for the networks may be explicitly specified at design time, or may be selected from a plurality of possible architecture candidates to ascertain the best performing candidate.

In some implementations, the approximated channel 120, the encoder 104, and the decoder 114 include a series of dense matrix multiplications.

The encoder 104 and the decoder 114 may be configured to encode and decode using any suitable machine-learning technique. In general, the encoder 104 may be configured to learn a mapping from input information 108 into a lower-dimensional or higher-dimensional representation as the transmitted signal 112. Analogously, the decoder 114 may be configured to learn a reverse mapping from a lower-dimensional or higher-dimensional received signal 140 into the reconstructed information 116.

As an example, the mappings that are implemented in the encoder 104 and decoder 114 may involve learning a set of basis functions for RF signals. In such scenarios, for a particular set of basis functions, the encoder 104 may transform the input information 102 into a set of basis coefficients corresponding to those basis functions, and the basis coefficients may then be used to generate a transmitted RF waveform (for example, by taking a weighted combination of the basis functions weighted by the basis coefficients) . Analogously, the decoder 114 may generate the reconstructed information 116 by generating a set of basis coefficients from a received RF waveform (for example by taking projections of the received RF waveform onto the set of basis functions). The basis functions themselves may be any suitable orthogonal or non-orthogonal set of basis functions, subject to appropriate constraints on energy, amplitude, bandwidth, or other conditions.

During deployment of the encoder 104 and decoder 114, in some implementations, the encoder 104 and/or decoder 114 utilizes simplified encoding and decoding techniques based on results of training machine-learning networks. For example, the encoder 104 and/or decoder 114 may utilize approximations or compact look up tables based on the learned encoding/decoding mappings. In such deployment scenarios, the encoder 104 and/or decoder 114 may implement more simplified structures, rather than a full machine-learning network. For example, techniques such as distillation may be used to train smaller machine-learning networks which perform the same signal processing function. A similar approach can be used to create more compact versions of the approximated channel 120 network (and of a discriminator network, as discussed in more detail with respect to FIGS. 7-9).

In some implementations, the encoder 104 and/or decoder 114 includes one or more fixed components or algorithms that are designed to facilitate communication over RF channels, such as expert synchronizers, equalizers, etc. As such, during training, the encoder 104 and/or decoder 114 may be trained to learn encoding/decoding techniques that are suitable for such fixed components or algorithms. Similarly, during training, the approximated channel 120 may be trained to simulate channel 108 by also taking into account the fixed components or algorithms of the encoder 104 and/or decoder 114. During training, the approximate channel 120 may also be trained to simulate channel 108 by taking into account the components of the digital to analog converter 106 and the analog to digital converter 110.

In some implementations, the encoder 104 and decoder 114 networks leverage prior knowledge of efficient network structures, methods of synchronization, estimation, or attention (i.e., the ability to focus resources on a certain subset of data, or to synchronize or canonicalize subsets of information from the original received information, often in a learned way). Such knowledge of efficient network structures may include connectivity of activations, layers, and/or assigned weights. By leveraging this knowledge, the disclosed system can further reduce the time and resources required for designing a communications system.

RF signals that are transmitted and received by system 100 may include any suitable radio-frequency signal, such as acoustic signals, optical signals, or other analog waveforms. The spectrum of RF signals that are processed by system 100 may be in a range of 1 kHz to 300 GHz. For example, such RF signals include very low frequency (VLF) RF signals between 1 kHz to 30 kHz, low frequency (LF) RF signals between 30 kHz to 300 kHz, medium frequency (MF) RF signals between 300 kHz to 1 MHz, high frequency (HF) RF signals between 1 MHz to 30 MHz, and higher-frequency RF signals up to 300 GHz.

FIG. 2 illustrates an example of adversarially training an RF system 200 that includes a machine-learning encoder 204 and a machine-learning decoder 212, and an approximated channel 210 having a machine-learning network ("channel network"). The encoder 204 and the decoder 212 may implement encoding and decoding techniques that were learned by machine learning networks ("encoder network" and "decoder network") to communicate over a real-world RF channel (e.g., channel 108 as shown in FIG. 1). The approximated channel 210 has a machine-learning network taught to approximate a real-world RF channel (e.g., channel 108 as shown in FIG. 1).

In some implementations, encoder 204 is encoder 104 as shown in FIG. 1. In some implementations, decoder 212 is decoder 114 as shown in FIG. 1. In some implementations, approximated channel 210 is approximated channel 120 as shown in FIG. 1. In some implementations, input information 202 is input information 102 as shown in FIG. 1.

In some implementations, the networks of the encoder 204 and decoder 212 are utilized for training to learn suitable encoding and decoding mappings, and such mappings may be implemented in a deployed system using more simplified encoders and decoders. For example, a deployed system may utilize using lookup tables at the encoder and distance-based metrics at the decoder, or other simplified forms of encoding and decoding, that are designed based on results of training the encoder 204 and decoder 212 networks.

The approximated channel 210 that is implemented during training may be a model of an RF channel that is obtained via simulation and/or based on real-world RF channel data (e.g., channel 108 as shown in FIG. 1). For example, in some implementations, training begins with a simulated channel model and training the encoder network and the decoder network based on simulated propagation models reflecting a real world propagation environment or emitter data. The encoder network and the decoder network may then be further trained against a real channel where hardware is used with a training feedback loop.

In some implementations, the approximated channel 210 includes effects of transmitter and receiver components, such as filtering, modulation, etc. For example, in scenarios where a simulated channel is used for training, an analytic channel impairment model may be utilized that fits a specific set of hardware/software and wireless deployment conditions. As such, the training in FIG. 2 may train the encoder network of encoder 204 and the decoder network of decoder 212 to operate under different channel conditions, as well as for different real-world transmitter and receiver scenarios.

During training, the encoder network and the decoder network may either be jointly trained or iteratively trained. For example, the encoder network and decoder network may be jointly trained as an auto-encoder (as described in regards to FIG. 1, above). When jointly trained, both networks may be updated at the same time, at a similar time, and/or during the same iteration of the training process. In some implementations, the encoder network and decoder network are separately/iteratively trained. In such scenarios, one of the networks may be fixed, either by previous training or by a transmission/reception scheme, while the other network is trained to learn an encoding/decoding strategy that is appropriate for the fixed counterpart network.

For example, in instances of iterative training, the encoder network may be fixed to generate a particular mapping of input information 202 for radio transmission 206, and the decoder network may be trained to learn a mapping from the outputted RF signal of the approximated channel 210 (e.g., simulated received signal 142 as shown in FIG. 1) to reconstructed information (e.g., reconstructed information 116 as shown in FIG. 1) that is best suited for the fixed network of encoder 204. In some implementations, the input information 202 is represented by training data that is utilized for training purposes. The training data may have a different form than the input information 202, but nonetheless may represent the input information 202 for purposes of training. In such scenarios, the encoder network may processes the training data that represents the input information 202, and the decoder network may generate reconstructed information as a reconstruction of the input information 202 represented by the training data.

Similarly, during training, the channel network of the approximated channel 210 may either be jointly trained or iteratively trained with the encoder network and/or decoder network. In some implementations, the channel network is jointly trained with the encoder network and/or decoder network, such that a combined loss of the system 200 is calculated (e.g., by combined loss function 222) and minimized. In some implementations, the channel network of the approximated channel 210 is separately/iteratively trained with the encoder 204 and/or decoder 212 network(s), where the channel network and the encoding and/or decoding networks have competing "adversarial" objectives. In such scenarios, one or more of the networks may be fixed, either by previous training or by a transmission/reception scheme, while one or more of the other networks are trained to either learn an encoding/decoding strategy that is appropriate for the fixed counterpart network(s) (e.g., for training the encoding and/or decoding network) or to learn the transfer function of one or more analog electronic radio components and/or wireless transmission channels (e.g., for training the channel network).

For example, the encoder network and decoder network may be fixed to generate a particular mapping of input information 202 for radio transmission 206, and the channel network may be trained to learn the transfer function of one or more analog electronic radio components and/or wireless transmission channels (e.g., channel 108 as shown in FIG. 1). In some implementations, the input information 202 is represented by training data that is utilized for training purposes. The training data may have a different form than the input information 202, but nonetheless may represent the input information 202 for purposes of training. In such scenarios, the encoder network may process the training data that represents the input information 202, and the decoder network may generate reconstructed information as a reconstruction of the input information 202 represented by the training data.

The output of the encoder 204 may be a signal for transmission or simulated transmission (e.g., transmitted signal 130 as shown in FIG. 1). This signal may be provided to radio transmission 206. Radio transmission 206 may include a series of operations, including, for example, converting the signal from digital to analog form (e.g., by digital to analog converter 106 as shown in FIG. 1), amplifying the signal, and sending the signal by antenna. Radio transmission 206 may transmit the signal over various radio components and/or wireless transmission channels (e.g., channel 108 as shown in FIG. 1). This signal may be altered as a result of being transmitted. Radio reception 208 receives the altered signal and may convert it form an analog format to digital format. Radio reception 208 may include, for example, an analog to digital converter (e.g., analog to digital converter 110 as shown in FIG. 1), and/or various analog electronic components (e.g., an antenna). Radio reception 208 outputs a received signal (e.g., received signal 140 as shown in FIG. 1).

The output of the encoder 204 may also be provided to the approximated channel 210. The approximated channel 210 may produce a simulated received signal (e.g., simulated received signal 142 as shown in FIG. 1). The simulated received signal may be provided to the decoder 212. Decoder 212 may produce reconstructed information (e.g., reconstructed information 116) that attempts to reproduce input information 202.

The system 200 may perform a first distance computation 214 between the received signal outputted from radio reception 208 and the simulated received signal outputted from the approximated channel 210. The first distance computation 214 may be a loss function. The first distance computation 214 may be any suitable measure of distance between the two received signals, such as (i) cross-entropy, (ii) a geometric distance metric, (iii) a measure of probability distribution, or (iv) a measure distance between characterizing the two received signals (e.g. mean, variance, envelope statistics, phase statistics, etc.). The results of the first distance computation 214 are provided to approximated channel updates 218 in order to update the channel machine-learning network of the approximated channel 210. Here, the objective of the approximated channel updates 218 is to minimize the first distance computation 214 in future iterations of the training process.

The system 200 may also compute a second distance computation 216 between the input information 202 and the reconstructed information outputted from the decoder 212. The second distance computation 216 may be a loss function. The second distance computation 216 may be any suitable measure of distance between the input information 202 and the reconstructed information, such as (i) cross-entropy, (ii) mean squared error, (iii) other geometric distance metric (e.g., MAE), or (iv) another measure of accuracy of the reconstructed bits, codewords, or messages of the input information 202 from the reconstructed information. The results of the second distance computation 216 are provided to encoder/decoder updates 220 in order to update the machine-learning networks of the encoder 204 and decoder 212. Here, the objective of the encoder/decoder updates 220 is to minimize the second distance computation 216 in future iterations of the training process.

In some implementations, additional loss terms are used in the first distance computation 214 and/or the second distance computation 216 in combination with such primary loss terms, for example to accomplish secondary objectives (e.g., to reduce interference imposed upon a secondary receiver, or to improve favorable signal properties such as peak to average power ratio (PAPR)).

In addition to achieving an objective that includes the first distance computation 214/loss function and/or the second distance computation 216/loss function, the system 200 may also be configured to achieve an objective related to other performance measures, such as power, bandwidth, complexity, or other performance metrics that are relevant for communication. In some implementations, the system 200 is configured to achieve a desired trade-off between different performance metrics. For example, achieving such a trade-off may be implemented using an objective function that combines different metrics, for example as a weighted combination of the metrics. In addition or as an alternative, this trade-off may be achieved by selecting a model according to user preferences or application specifications. In addition or as an alternative, the system 200 may implement one or more hard constraints on performance metrics, such as constraints on power, bandwidth, reconstruction error, etc.

The first distance computation 214 may be performed iteratively or jointly with the second distance computation.

In implementations where the first distance computation 214 and the second distance computation 216 are performed iteratively/separately, one may be performed before the other. For example, approximated channel updates 218 may receive the output of the first distance computation 214 and determine updates for approximated channel 210 before the second distance computation 216 is performed. In this example, the updates may also be sent to the approximated channel 210 and implemented by the approximated channel 210 before the second distance computation 216 is performed.

In these implementations, one or more networks may be fixed (e.g., parameter/layer weights of the networks are fixed and placed and not updated during the training process) while one or more other networks are updated. For example, where a first distance computation 214 is performed and approximated channel updates 218 are determined, the channel network of approximated channel 210 may be updated (e.g., the parameter/layer weights of the network may be updated) while the encoder 204 and decoder 212 networks are fixed.

In implementations where the first distance computation 214 is performed jointly with the second distance computation 216, the first distance computation 214 and the second distance computation 216 may be performed at the same time, at substantially the same time, and/or during the same iteration of the training process. In addition, in these scenarios, the system 200 may perform a combined distance computation 222.

In some implementations, the system 200 also performs the combined distance computation 222. The combined distance computation may be a summation of the results of the first distance computation 214 and the second distance computation 216. The results of the combined distance computation 222 may be provided to approximated channel updates 218 and encoder/decoder updates 220 in order to update the machine-learning network of the approximated channel 210 and the machine-learning networks of the encoder 204 and decoder 212, respectively. Here, the objective of the approximated channel updates 218 and encoder/decoder updates 220 is to minimize the combined distance computation 222. In some implementations, a combined distance computation 222 is calculated but is not outputted to the approximated channel updates 218 nor the encoder/decoder updates 220.

The network update process (e.g., approximated channel updates 218 and encoder/decoder updates 220) may update the channel network, the encoder network, and/or the decoder network based on the various performance metrics. This updating may include updates to the network architectures, parameters, or weights of the networks. For example, the updating may include updating weights or parameters in one or more layers of the networks, selecting machine-learning models for the networks, or selecting a specific network architecture, such as choice of layers, layer-hyperparameters, or other network features. As discussed, updating may be implemented on the channel network and the encoder and/or decoder network(s), in a joint or iterative manner.

As discussed above, the updates performed by the network update process (e.g., approximated channel updates 218 and/or encoder/decoder updates 220) may be performed during training, and/or may be performed during deployment to further update the channel network, the encoder network, and/or decoder network based on real-world deployment performance results.

In some implementations, the network update process (e.g., approximated channel updates 218 and/or encoder/decoder updates 220) updates the channel network, the encoder network, and/or decoder network to achieve a desired objective function(s), which may include loss function(s) (e.g., first distance computation 214 and second distance computation 216) and other performance metrics discussed above. In some implementations, the network update process utilizes an optimization method such as one of evolution (e.g., a genetic algorithm), gradient descent, stochastic gradient descent, or other solution technique.

As an example of gradient-based updates, the network update process (e.g., approximated channel updates 218 and/or encoder/decoder updates 220) may calculate a rate of change of the objective function(s) relative to variations in the encoder network and/or decoder network, for example by calculating or approximating a gradient of the objective function. Such variations may include, for example, variations in the weights of one or more network layers, or other network architecture choices. Here, where the approximated channel 210 is based on real RF channel data and does not have a closed form gradient solution, the gradient of the objective function(s) is estimated using the channel machine-learning network of the approximated channel 210.

Based on the calculated rate of change of the objective function(s), the network update process (e.g., approximated channel updates 218 and/or encoder/decoder updates 220) may determine a first variation for the encoder network and/or a second variation for the decoder network. These variations may be computed, for example, using Stochastic Gradient Descent (SGD) style optimizers, such as Adam, AdaGrad, Nesterov SGD, or others. In some implementations, these variations are computed using other scalable methods for direct search, such as evolutionary algorithms or particle swarm optimizations.

Once the variations have been determined, the network update process then applies those variations to the encoder network and/or the decoder network. For example, the network update process may update at least one encoding network weight in one or more layers of the encoder network, and/or at least one decoding network weight in one or more layers of the decoder network.

In general, updating the channel network, the encoder network, and/or the decoder network is not limited to updating network weights, and other types of updates may be implemented. For example, updating the networks may include selecting a machine-learning model for the encoding network, from among a plurality of encoding models, and selecting a machine-learning model for the decoder network, from among a plurality of decoding models. In such implementations, selecting machine-learning models may include selecting a specific network architecture, such as choice of layers, layer-hyperparameters, or other network features.

By training the encoder network and/or decoder network over the approximated channel 210 having a channel network and emulating a real-world RF channel, the encoder network and decoder network may be optimized to communicate over a particular RF channel even for difficult cases (e.g., the transfer function of the component or wireless effect is hard to model or compensate for accurately or at low computational complexity in traditional systems, often leading to performance degradation). By using an approximated channel 210 having a channel network to train the encoder 204 and/or decoder 212 networks, the need for a closed form channel model or assumption about the channel effects on the system 200 are removed.

In some implementations, the encoder network and the decoder network are also trained when a real-world channel is used (e.g., when the lower path is followed in FIG. 1). In such implementations, additional transmission and reception components (either hardware or software) may be implemented to transmit and receive analog RF waveforms over the real channel. Such transmit and receive components may be implemented either in the encoder network and decoder network, or their effects may be included in the channel effects that are accounted for in the approximated channel 210.

Training the channel machine-learning network (also referred to as "channel network"), the encoder machine-learning network (also referred to as "encoder network"), and/or the decoder machine-learning network (also referred to as "decoder network") may begin with any suitable set of initial conditions. For example, the training may begin with a random set of basis functions subject to certain conditions. Alternatively, the training may begin with a fixed set of basis functions, such as commonly used RF communication basis functions including Quadrature Phase-Shift Keying (QPSK) or Gaussian Binary Frequency Shift Keying (GFSK), orthogonal frequency division multiple access (OFDM), or other fixed set of basis functions.

During training, the encoder network and the decoder network attempt to learn improved basis functions, according to results of encoding and decoding. Training the encoder 204 and decoder 214 may involve optimizing over a set of basis functions or over different sets of basis functions, for example using greedy search or other optimization-type algorithm.

In some implementations, the input information 202 is chosen from a training set of information. The input information 202 is, in some implementations, limited to a particular class of information, such as binary information, discrete-time information, analog waveforms, or other class of information. In such scenarios, the system 200 will be trained to learn communication encoding and decoding techniques that are tuned to communicate that particular class of information (over a particular channel). By training on different types of input information 202 and for a particular approximated channel 210 (e.g., that may emulates a particular real-world channel), the system 200 may be trained to learn near-optimal encoding and decoding operations for a particular communication scenario.

The distance computations/loss functions (e.g., first distance computation 214, second distance computation 216, combined distance computation 222) may be any suitable measure, or combination of measures, of distance between either the input information 202 and the reconstructed information, or the received signal and the simulated received signal. For example, the distance computations/loss functions may include cross-entropy, mean squared error (MSE), clipped MSE which penalizes predicted values according to MSE but only for values which fall on the wrong side of a decision threshold, or an exponential loss function that penalizes loss exponentially, or other suitable distance metric(s).

In addition, as discussed above, other performance metrics may be incorporated into training, for example as part of the distance computations/loss functions and/or as hard constraints, etc. For example, such performance metrics may include bit error rate (BER) as a function of the signal-to-noise ratio (SNR), communication bandwidth, communication power, spectral efficiency (the number of bits per second that can be transmitted over a fixed bandwidth channel at a specific SNR). Any one or combinations of such metrics may be utilized during training as part of the distance computations/loss functions (e.g., as a weighted combination) and/or as hard constraints in addition to the distance computations/loss functions.

Figure 3A:
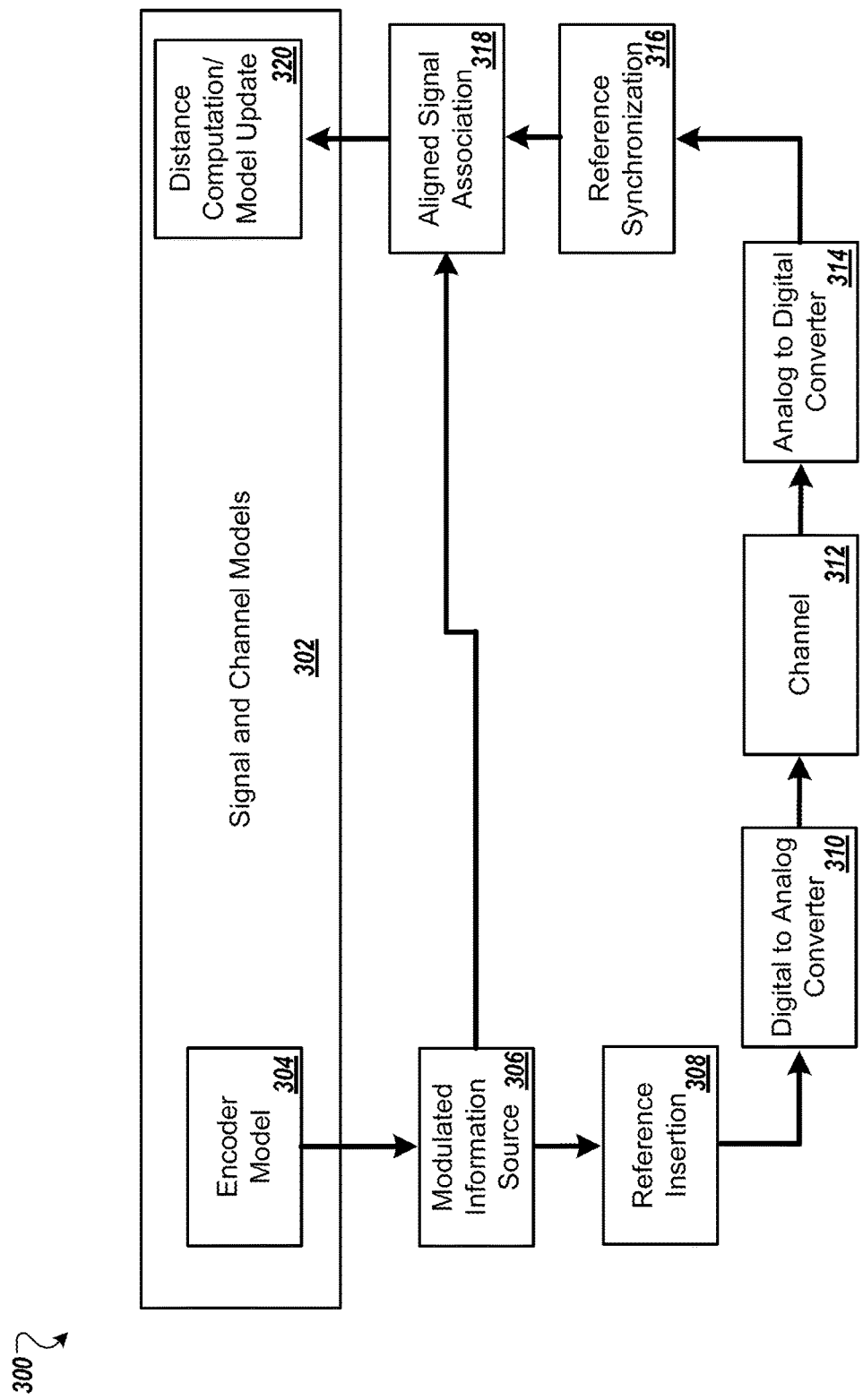
FIG. 3A illustrates an example system for training signal and communication channel models using a real-world RF channel without a common timing source.

FIG. 3A illustrates an example system 300 for training signal and communication channel models 302 using a real-world RF channel 312 without a common timing source. The signal and communication channel models 302 may include an approximated channel (e.g., approximated channel 120 as shown in FIG. 1, or approximated channel 210 as shown in FIG. 2) having a machine-learning network ("channel network"). The signal and communication channel models 302 may include an encoder model 304 (e.g., encoder 104 as shown in FIG. 1, or encoder 204 as shown in FIG. 2) having a machine-learning network ("encoder network"). The signal and communication channel models 302 may include a decoder model (e.g., decoder 114 as shown in FIG. 1, or decoder 214 as shown in FIG. 2) having a machine-learning network ("decoder network").

Figure 4:
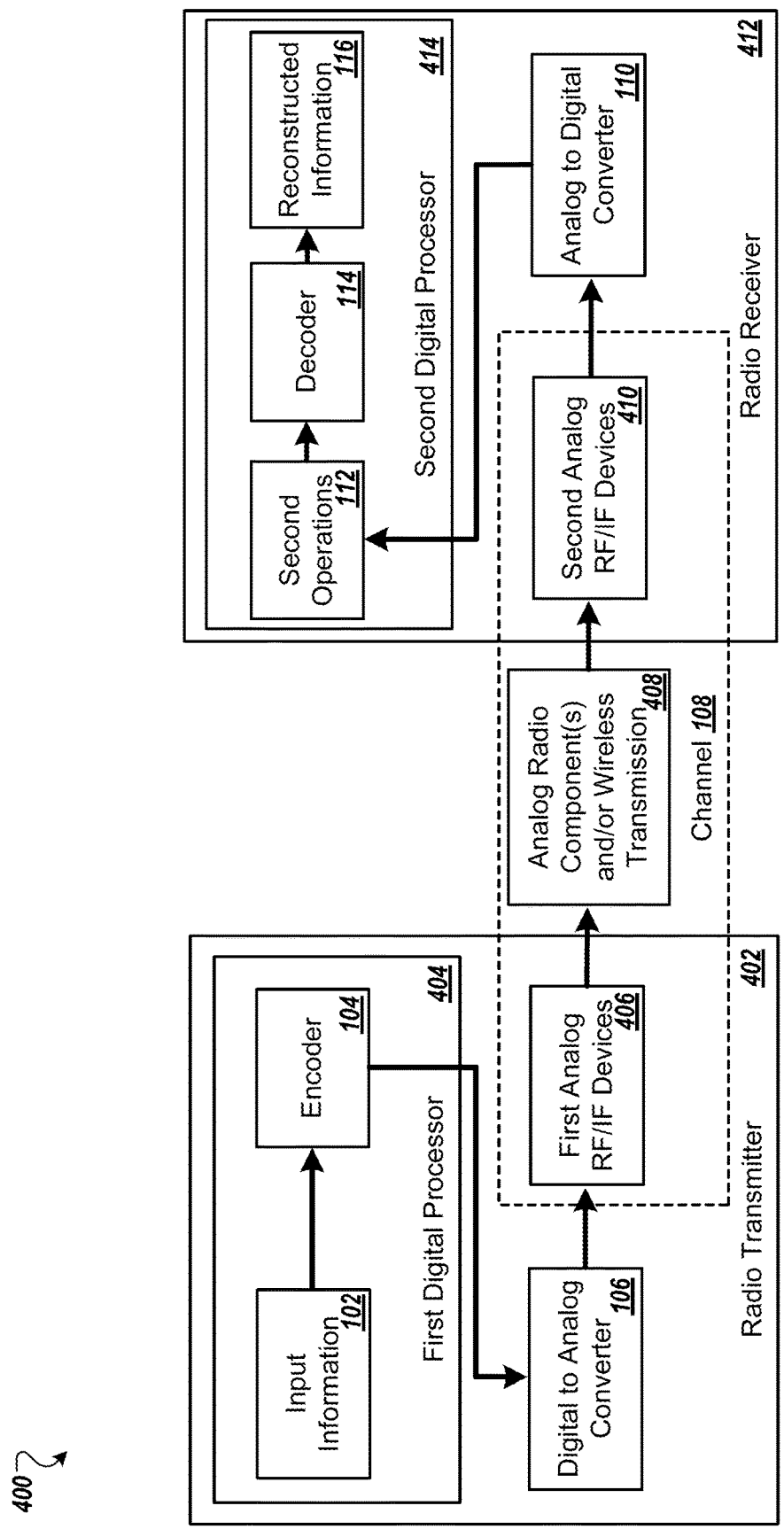
FIG. 4 illustrates an example of deploying learned encoder and decoder machine-learning networks into a functional RF communications system.

The communication channel model 302 may by trained through an iterative process, where no timing reference (e.g., a timing source) is shared between a radio transmitter (not shown; see FIG. 4) and a radio receiver (not shown; see FIG. 4).

As shown, a signal encoder model 304 is used with chosen or random information (e.g., input information 102 as shown in FIG. 1, or input information 202 as shown in FIG. 2) to produce a modulated information source 306 of encoded information to transmit over the radio channel (e.g., transmitted signal 130 as shown in FIG. 1).

A reference tone is inserted into the encoded information at a known time offset from the encoded information (e.g., immediately preceding it) by the reference insertion 308 operation. The reference tone may be a pseudorandom (PN) chip, or other known preamble or reference tone. "Exploration" signals, such as Gaussian noise can be used to explore the channel input value space (and thus get a better characterization of the channel response for a wide range of possible input values), where the random noise can be derived from a common value, seed, or sequence at the transmitter or receiver.

The encoded information having the inserted reference tone is then converted from digital form into an analog radio signal using a digital to analog converter 310 (e.g., digital to analog converter 106 as shown in FIG. 1), passing through a series of possible other analog components, such as amplifiers or filters, among others, and passing over a wireless (or wired) real-world channel 312 (e.g., channel 108 as shown in FIG. 1) before arriving (possibly through other RF analog components) at an analog to digital converter 314 (e.g., analog to digital converter 110 as shown in FIG. 1) where the signal is converted back to digital form.

A reference synchronization 316 operation may then be performed in order to determine the arrival time, frequency, phase, angle, antenna combining scheme, or otherwise of the encoded and transmitted information having the inserted reference tone. Using the arrival time and the known offset time of the reference tone, the timing (and frequency) of the encoded and transmitted information can be determined.

This encoded and transmitted information can then be recovered through a process of aligned signal association 318, where, for example, the time □aligned (and possibly frequency □aligned) signal is extracted from the received digital signal using the reference synchronization information from reference synchronization 316, and can be associated with the encoded and transmitted information from the modulation information source 306. This association may result, for example, in forming a tuple of (s, r), where s is the encoded and transmitted information and r is the received information, where both the s and r are time □aligned and frequency □aligned with each other to a high degree of precision.

This tuple, (s, r) can then be used in the distance/model update process 320 in order to update the signal and communication0 channel models 302, for instance by first updating the weights of a channel approximation network (e.g., approximated channel 120 as shown in FIG. 1, or approximated channel 210 as shown in FIG. 2) and then updating the encoder 304 and decoder network weights through the iterative process as described above with reference to FIG. 2.

Figure 3B:
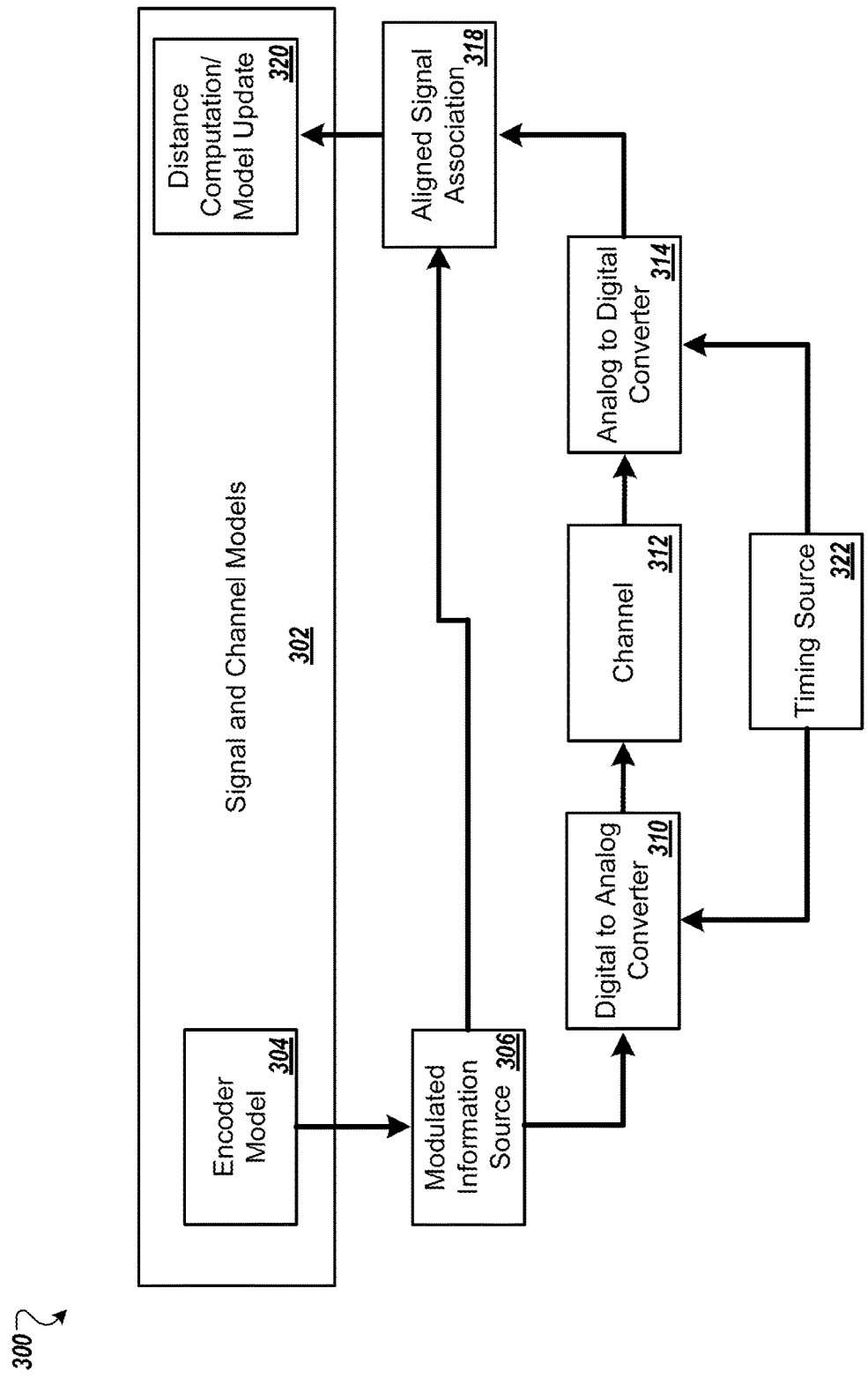
FIG. 3B illustrates an example system for training signal and communication channel models using a real-world RF channel and a common timing source.

FIG. 3B illustrates an example system 300 for training signal and communication channel models 302 using a real-world RF channel 312 with a common timing source. The signal and communication channel models 302 may include an approximated channel (e.g., approximated channel 120 as shown in FIG. 1, or approximated channel 210 as shown in FIG. 2) having a machine-learning network ("channel network"). The signal and communication channel models 302 may include an encoder model 304 (e.g., encoder 104 as shown in FIG. 1, or encoder 204 as shown in FIG. 2) having a machine-learning network ("encoder network"). The signal and communication channel models 302 may include a decoder model (e.g., decoder 114 as shown in FIG. 1, or decoder 214 as shown in FIG. 2) having a machine-learning network ("decoder network").

The communication channel model 302 may by trained through an iterative process, where a timing reference, such as timing source 322 is shared between a radio transmitter (not shown; see FIG. 4) and a radio receiver (not shown; see FIG. 4).

As shown, a signal encoder model 304 is used with chosen or random information (e.g., input information 102 as shown in FIG. 1, or input information 202 as shown in FIG. 2) to produce a modulated information source 306 of encoded information to transmit over the radio channel (e.g., transmitted signal 130 as shown in FIG. 1).

The encoded information is then converted from digital form into an analog radio signal using a digital to analog converter 310 (e.g., digital to analog converter 106 as shown in FIG. 1), passing through a series of possible other analog components, such as amplifiers or filters, among others, and passing over a wireless (or wired) real-world channel 312 (e.g., channel 108 as shown in FIG. 1) before arriving (possibly through other RF analog components) at an analog to digital converter 314 (e.g., analog to digital converter 110 as shown in FIG. 1) where the signal is converted back to digital form.

Both the digital to analog converter 310 and the analog to digital converter 314 receive a common timing source 322, which can be, for example, a 10 megahertz (MHz) Pulse□per□second (PPS) signal from a test signal generator passed through a splitter. Alternatively, the timing source 322 can be derived from an external signal, such as a global positioning system (GPS) signal or another radio communications system and provided to both the digital to analog converter 310 and the analog to digital converter 314.

Because of the common timing source 322, the sampling times of the digital to analog converter 310 and the analog to digital converter 314 are known to be nearly the same. That is, the sampling times of both converters are within some error tolerance (e.g., less than 1 nanosecond of timing jitter).

The encoded and transmitted information can then be recovered through a process of aligned signal association 318, where, for example, the time□aligned (and possibly frequency□aligned) signal is extracted from the received digital signal using the knowledge of timing being near identical from the digital to analog converter 310 and the analog to digital converter 314, and may be associated with the encoded and transmitted information from the modulation information source 306. This association may result, for example, in forming a tuple of (s, r), where s is the encoded and transmitted information and r is the received information, and both are now time□aligned and frequency-aligned with each other to a high degree of precision.

The tuple, (s, r) can then be used in the distance/model update process 320 in order to update the signal and communication channel models 302, for example, by first updating the weights of a channel approximation network (e.g., approximated channel 120 as shown in FIG. 1, or approximated channel 210 as shown in FIG. 2) and then updating the encoder 304 and decoder network weights through the iterative process as described above with reference to FIG. 2.

FIG. 4 illustrates an example of deploying learned encoder 104 and decoder 114 machine-learning networks in a functional RF communications system 400. The functional RF communications system 400 may be, for example, a cellular phone, a radio, a router, or a modem, among others system. The communications system 400 uses learned encoding (e.g., encoding and/or decoding machine-learning networks) for purposes of wirelessly communicating information.

In some implementations, the communications system 400 implements the encoder 104 and the decoder 114 from FIG. 1 after their machine-learning networks have been trained iteratively or jointly with an approximated channel (e.g., approximated channel 120 as shown in FIG. 1) having a machine-learning network. In these implementations, the approximated channel is trained to emulate channel 108.

In the disclosed example of FIG. 4, the communications system 400 includes a radio transmitter 402 and a radio receiver 412, which can be, for example, a cellular handset and a cellular base station respectively. The radio transmitter 402 has a digital processor/logic circuit 404 ("first digital processor"). The radio receiver 412 also has a digital processor/logic circuit 414 ("second digital processor"). Each of the first and second digital processors may be, for example, an embedded processor, an FPGA, a DSP chip, logic inside a customer ASIC, a neuromorphic processor, a tensor processor, or other similar digital logic system.

The encoder 104 is deployed in the first digital processor 404 and the decoder is deployed in the second digital processor 414. In some implementations, the first digital processor 404 and the second digital processor 414 are transceivers which include both decoders and encoders for forward and reverse link connections to each other, or to a network of transceiver devices.

In some implementations, the radio transmitter 402 employs other analog RF/IF devices 406 on the transmit path, e.g., filters, amplifiers, mixers, etc., while the radio receiver 412 employs similar analog RF/IF devices 410 (e.g., radio frequency and/or intermediate frequency devices) on the received signal before digitization. RF/IF devices 406 and 410 may be part of channel 108 (and account for some of the signal impairment across the channel), along with analog radio component(s) and/or wireless transmission channels 408.

Second operations 112 may be performed on the received digital signal (i.e., the signal outputted from the analog to digital converter 110) before the signal is decoded by decoder 114. Second operations 112 may include various pre□processing and/or normalization operations, such as detection, synchronization, normalization, filtering, tuning, etc. Generally, these second operations 112 are realized as digital signal processing (DSP) routines. However, second operations 112 can also involve additional neural network based pre□processing tasks.

In some implementations, other operations (e.g., first operations 118 as shown in FIG. 1) are performed on the output signal of the encoder 104 before it is passed to the digital to analog converter 106.

Figure 5:
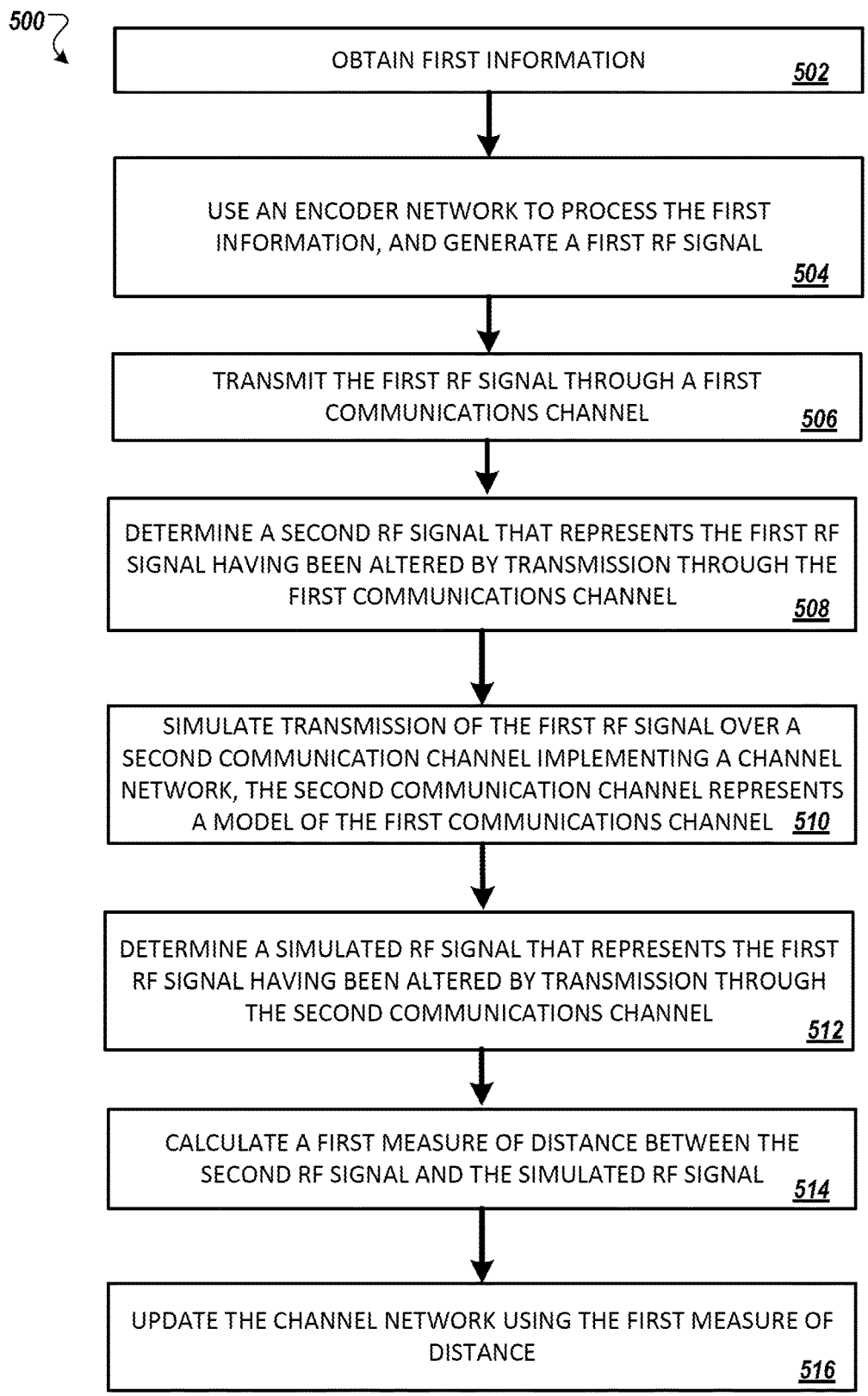
FIG. 5 illustrates an example flowchart for training a machine-learning network of an approximated communications channel.

FIG. 5 is a flowchart illustrating an example method 500 for training a machine-learning network of an approximated communications channel of an RF system. The training method 500 may be performed by one or more processors, such as one or more CPUs, GPUs, DSPs, FPGAs, ASICs, TPUs, or neuromorphic chips or vector accelerators that execute instructions encoded on a computer storage medium.

In some implementations, the method 500 is performed by the components of system 100 (and/or system 200, and/or system 400), such as encoder 104 to produce transmitted signal 130, digital to analog converter 106 to convert the transmitted signal 130 to an analog signal, real-world channel 108 to have the analog signal transmitted over, analog to digital converter 110 to produce received signal 140, and decoder 114 to reconstruct the input information 102.

Accordingly, the method 500 is described with respect to components of the system 100 (and/or system 200, and/or system 400). However, the method 500 also can be performed by other systems.

The method 500 includes obtaining first information (502). For example, first information may be information that is to be communicated over an RF channel. As discussed above, the first information may be any suitable discrete-time, analog, discrete-valued, or continuous-valued information, such as input information 102. For example, in some instances, this input information may be whitened discrete bits or symbols, or in other cases, the input information may follow the distribution of a non-whitened information source. As previously discussed in regards to FIG. 2, above, in some implementations, the first information is represented by training data that is utilized for training purposes. In such scenarios, the training data may have a different form than the first information, but nonetheless may represent the first information for purposes of training.

An encoder machine-learning network is used to process this first information to generate a first RF signal (504). For example, as discussed above, in some implementations the first information is represented by training data, in which case the encoder machine-learning network processes the training data representing the first information. Furthermore, as discussed above, the generated first RF signal may represent an analog RF waveform that is transmitted over a channel, or may be an intermediate representation (e.g., samples, basis coefficients, distributions over RF waveforms, etc.) that undergoes further processing (e.g., filtering, D/A conversion, modulation, etc.) to generate an analog RF waveform. This encoding process may utilize any suitable mapping from an input information space into an RF signal space, as discussed in regards to FIG. 2, above. The first RF signal may be transmitted signal 130 as shown in FIG. 1. The first RF signal may be the output of the encoder 204 as shown in FIG. 2 (or encoder 104 as shown in FIGS. 1 and 4). The first RF signal may be the output of radio transmission 206 as shown in FIG. 2.

The method 500 further includes transmitting the first RF signal through a first communications channel (506). For example, first communications channel may include a single wireless transmission channel, multiple wireless transmission channels, various analog radio components, or a combination of one or more transmission channels and analog radio components. First communications channel may be a real-world communications channel, such as, for example, a wireless local area network (WLAN) channel, a Wi-Fi channel, a Bluetooth channel, a cellular network channel (e.g., one implementing GSM or UMTS technology), etc. First communications channel may be channel 108 as shown in FIGS. 1 and 4, or channel 312 as shown in FIGS. 3A-3B.

The method 500 further includes determining a second RF signal that represents the first RF signal having been altered by transmission through the first communication channel (508). For example, in training scenarios, the effects of the first communication channel may be implemented by a model of a channel obtained by simulation and/or real channel data, or may be implemented by a real-world communication channel. As discussed above, the second RF signal may represent an analog RF waveform that is received over a channel, or may be an intermediate representation (e.g., samples, basis coefficients, distributions over RF waveforms etc.) that is a result of processing (e.g., filtering, sampling, equalizing, etc.) a received analog RF waveform. The second RF signal may be received signal 140 as shown in FIG. 1. The second RF signal may be the output of radio reception 208 as shown in FIG. 2.

The method 500 further includes simulating transmission of the first RF signal over a second communication channel implementing a channel network, the second communication channel representing a model of the first communications channel (510). For example, the second communications channel can be an approximated channel, such as, for example, approximated channel 120 as shown in FIG. 1 or approximated channel 210 as shown in FIG. 2.

The method 500 further includes determining a simulated RF signal that represents the first RF signal having been altered by transmission through the second communications channel (512). For example, the simulated RF signal may be the simulated received signal 142 as shown in FIG. 1. The simulated RF signal may be the output of the approximated channel 210 as shown in FIG. 2.

The method 500 further includes calculating a first measure of distance between the second RF signal and the simulated RF signal (514). For example, this measure of distance may be the first distance computation 214 as shown in FIG. 2. This measure of distance may be implemented as a loss function and may represent a difference or error between the second RF signal (e.g., received signal 140 as shown in FIG. 1) and the simulated RF signal (e.g., simulated received signal 142 as shown in FIG. 1). As examples, the measure of distance may include cross-entropy, a geometric distance metric, a measure of probability distribution, or a measure distance between characterizing the two received signals (e.g. mean, variance, envelope statistics, phase statistics, etc.).

The method 500 further includes updating the channel network using the first measure of distance (516). For example, this update may be applied to the channel network in a joint or iterative manner with the encoder network (and/or the decoder network). The updates may generally include updating any suitable machine-learning network feature of the channel network, such as network weights, architecture choice, machine-learning model, or other parameter or connectivity design, as discussed in regards to FIG. 2, above. This update may be approximated channel updates 218 as shown in FIG. 2.

Figure 6:
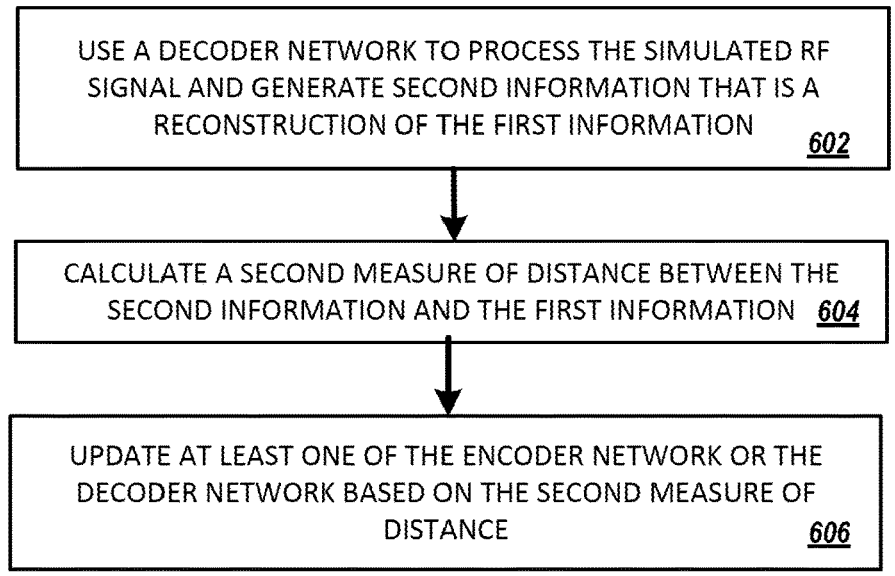
FIG. 6 illustrates an example flowchart for training an encoder machine-learning network and/or a decoder machine-learning network.

FIG. 6 is a flowchart illustrating an example method 600 for training an encoder machine-learning network and/or a decoder machine-learning network. The training method 600 may be performed by one or more processors, such as one or more CPUs, GPUs, DSPs, FPGAs, ASICs, TPUs, or neuromorphic chips or vector accelerators that execute instructions encoded on a computer storage medium.

In some implementations, the method 600 is performed by the components of system 100 (and/or system 200, and/or system 400), such as encoder 104 to produce transmitted signal 130, digital to analog converter 106 to convert the transmitted signal 130 to an analog signal, real-world channel 108 to have the analog signal transmitted over, analog to digital converter 110 to produce received signal 140, and decoder 114 to reconstruct the input information 102.

Accordingly, the method 600 is described with respect to components of the system 100 (and/or system 200, and/or system 400). However, the method 600 also can be performed by other systems.

In some implementations, method 600 follows or directly follows method 500 as shown in FIG. 5.

The method 600 further includes using a decoder machine-learning network to process the simulated RF signal and generates second information that is a reconstruction of the first information (602). For example, as previously discussed in regards to FIG. 2, in some implementations, the first information (e.g., first information from method 500 as shown in FIG. 5) is represented by training data that is utilized for training purposes. In such scenarios, the input training data may have a different form than the original first information, but nonetheless the decoder may generate the second information as a reconstruction of the first information that is represented by the training data. This decoding process may utilize any suitable mapping from an RF signal space into reconstructed information space, as discussed in regards to FIG. 2, above. The decoder may be decoder 114 as shown in FIGS. 1 and 4. The decoder may be decoder 212 as shown in FIG. 2.

The method 600 further includes calculating a second measure of distance between the second information and the first information (604). For example, this measure of distance may be the second distance computation 216 as shown in FIG. 2. This measure of distance may be implemented as a loss function and may represent a difference or error between the second information (e.g., reconstructed information 116 as shown in FIG. 1) and the first information (e.g., input information 102 as shown in FIG. 1). As examples, the measure of distance may include cross-entropy, mean squared error, other geometric distance metric (e.g., MAE), or another measure of accuracy of the reconstructed bits, codewords, or messages of the input information 202 from the reconstructed information.

The method 600 further includes updating at least one of the encoder machine-learning network or the decoder machine-learning network based on the second measure of distance (606). For example, this update may be applied to the encoder network and/or the decoder network in a joint or iterative manner (with respect to each other or with respect to the channel network of method 500 as shown in FIG. 5), or individually, as discussed above. The updates may generally include updating any suitable machine-learning network feature of the encoder network and/or decoder network, such as network weights, architecture choice, machine-learning model, or other parameter or connectivity design, as discussed in regards to FIG. 2, above. As an example, in some implementations, if the encoder network and/or decoder network are trained to learn a set of basis functions for communicating over the RF channel, then the update process includes updating the set of basis functions that are utilized in the encoder network and/or decoder network. This update may be encoder/decoder updates 220 as shown in FIG. 2.

Figure 7:
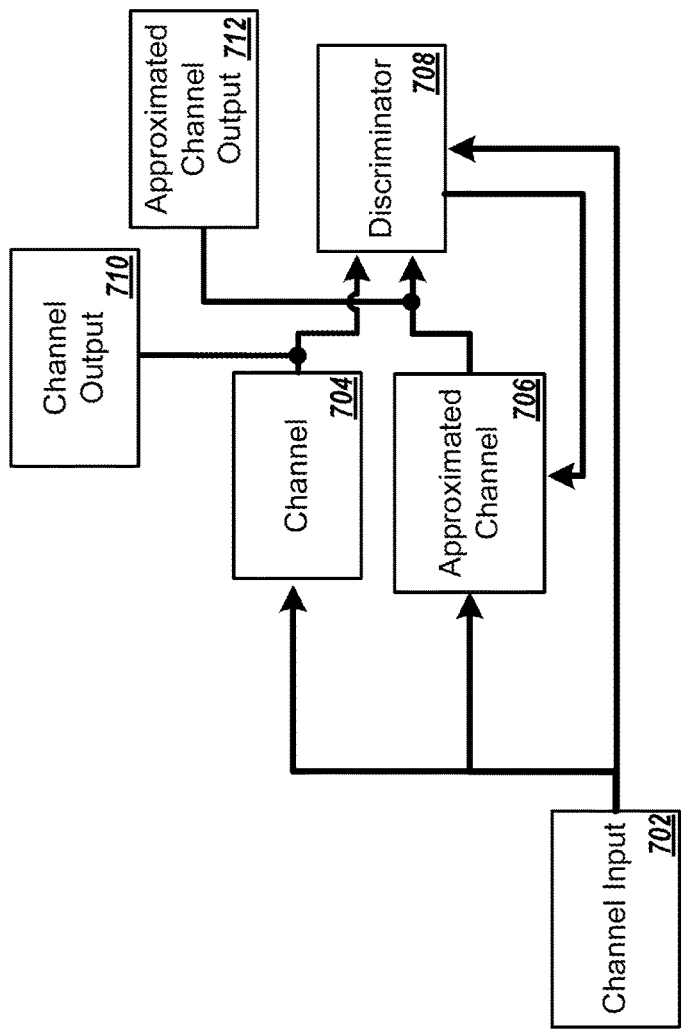
FIG. 7 illustrates an example of deploying a system that implements an approximated channel and a discriminator that utilize functions based on results of training a discriminator and a channel machine-learning networks to perform learned communication over a real-world RF channel.

FIG. 7 illustrates an example of deploying a system 700 that includes a real-world channel 704, an approximated channel 706, and a discriminator 708. The approximated channel 706 has a machine-learning network ("channel network") and the discriminator 708 has a machine-learning network ("discriminator network"). The approximated channel 706 and the discriminator 708 may form a generative adversarial network (GAN), where the channel network of the approximated channel 706 servers as a conditional generator network (e.g., generating representative outputs of the channel conditioned on possible input values such as transmitted symbol values, or locations of transmission or reception, or other inputs characterizing the transmission).

Discriminator 708 may be a binary classifier used to accurately distinguish between signals that have been produced/altered by channel 704 from those that have been produced/altered by approximated channel 706. In some implementations, in addition to or in place of a binary classifier output, discriminator 708 indicates a degree of similarity between channel 704 and approximated channel 706. For example, discriminator 708 may output a percentage indicating how close the approximated channel output 712 is to the channel output 710 (e.g., 98% would indicate that the channel 704 and approximated channel 706 are very similar, or near identical).

Channel 704 may represent a real-world channel or a function of a real-world channel, having, for example, complicated nonlinear effects of devices, propagation, interference, distortion or other common channel impairments. Channel 704 may include a single wireless transmission channel. Channel 108 may include multiple wireless transmission channels. Channel 108 may include various analog radio components. Channel 108 may include a combination of various analog radio components and one or more wireless transmission channels.

Channel input 702 may be a signal for transmission, such as an output of an encoder (e.g., transmitted signal 130 as shown in FIG. 1). Analogously, approximated channel output 712 may represent a simulated received signal (e.g., simulated received signal 142) that attempts to match a received signal (e.g., received signal 140 as shown in FIG. 1).

As shown in FIG. 7, channel input 702 is provided to both the channel 704 and the approximated channel 706. The output of the channel 704, channel output 710 is provided to the discriminator 708. The discriminator is also provided channel input 702. The discriminator 708 is also provided the output of the approximated channel 706, i.e., approximated channel output 712. By providing the discriminator 708 both the channel input 702 and the channel output 710, the discriminator 708 is able to more accurately discriminate between channel output 710 and approximated channel output 712, than when its input is restricted to the channel output 710 (and approximated channel output 712). However, in some implementations, the discriminator 708 does not have access to or is not provided the channel input 702. Whenever the discriminator 708 receives the channel output 710 and/or the approximated channel output 712, it attempts to determine whether the respective signal/output was produced/altered by the channel 704 or the approximated channel 706. For example, the discriminator 708 may correctly determine that approximated channel output 712 was produced/altered by the approximated channel 706 and outputs a binary result, e.g., 1 indicating that it believes the output came from the approximated channel 706. The result of the discriminator 708 may be provided to the approximated channel 706 in order to assist in updating the channel network of the approximated channel 706.

As will be discussed in more detail with reference to FIGS. 8 and 9, during training, the channel network may be trained to emulate channel 704 such that the differences/loss between the channel output 710 and the approximated channel output 712 is minimized. The discriminator network of discriminator 708 is trained to accurately predict whether a received signal (e.g., channel output 710 or approximated channel output 712) was produced by the channel 704 or the approximated channel 706. The discriminator network and the channel network may be jointly or iteratively trained. The channel network may also by trained by leveraging the topology of the discriminator 708. Numerous methods used in GAN literature may be used to train or improve the training of these networks. For instance, the WGAN-GP method may be used here to accelerate convergence and improve stability of the competing objectives.

Figure 8:
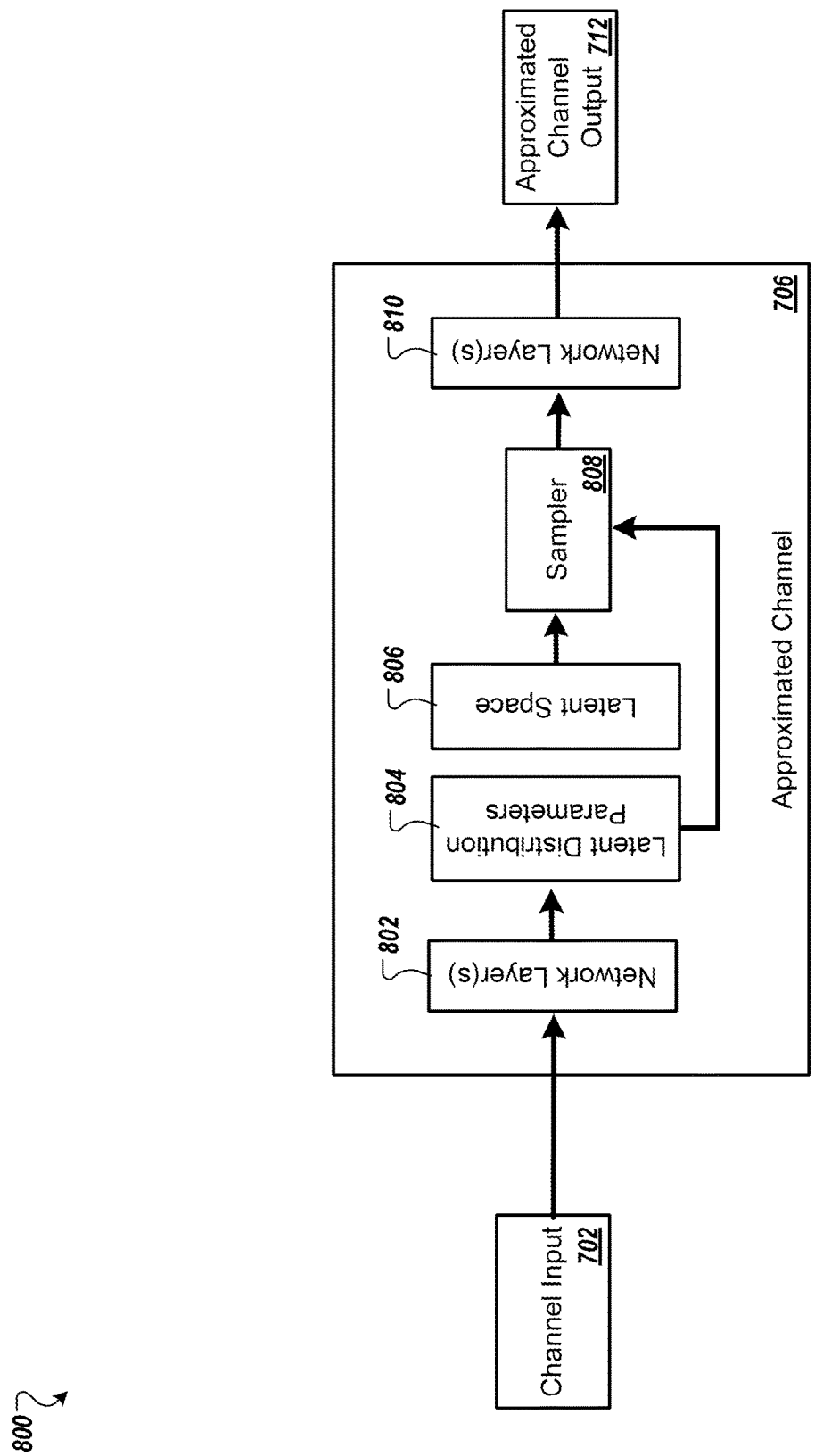
FIG. 8 illustrates an example of a network structure of an approximated communication channel implementing a variational machine-learning network.

FIG. 8 illustrates an example of a network structure 800 of an approximated communication channel 706 having a variational machine-learning network ("variational network"). The variational machine-learning network may be a generator network as part of a GAN (see discussion of FIG. 7 above).

The network structure 800 uses one or more layers (e.g., network layer(s) 802, network layer(s) 810, one or more hidden layers having latent space 806 and latent distribution parameters 804, etc.) or neurons that form a variational network. The output of each layer is used as input to the next layer in the network. Each layer of the network generates an output from a received input in accordance with current values of a respective set of parameters. For example, in some implementations, the variational network includes a plurality of networks that may be collectively or iteratively trained. In some implementations, network layer(s) 802 and network layer(s) are fully-connected rectified linear units (ReLU) layers.

The channel network is a variational machine-learning network because it implements a sampler 808 operation that randomly samples a latent space 806 from latent distribution parameters 804. Latent distribution parameters 804 and latent space 806, as well as the sampler 808 itself may be positioned in a hidden layer of the network or another non-hidden layer. The variational network uses inputs and/or weights to define an aspect of a probability distribution. As such, by implementing a variational machine-learning network, the disclosed system is able to accurately approximate the conditional distribution of a real-world channel (e.g., it may represent a stochastic distribution over the possible random behaviors in the channel). In contrast, if the disclosed system implemented a deterministic function for fixed parameters, it could not accurately approximate such a distribution.

Channel input 702 in FIG. 8 may be a signal for transmission, such as an output of an encoder (e.g., transmitted signal 130 as shown in FIG. 1). Analogously, approximated channel output 712 may represent a simulated received signal (e.g., simulated received signal 142) that attempts to match a received signal (e.g., received signal 140 as shown in FIG. 1). In some instances, networks may not be sequential in nature, leveraging connections between various layers or neurons which bypass or route through a plurality of possible architectures.

During training, the variational network may be trained to emulate a real-world channel (e.g., channel 704 as shown in FIG. 7, or channel 108 as shown in FIG. 1). During training, the variational network may approximate a channel function of a real-world channel through observation, or a similar regression network to minimize loss (e.g., mean square error loss) between the approximate channel 706 and a real-world channel.

In general, the variational network may include one or more collections of multiplications, divisions, and summations or other operations of inputs and intermediate values, optionally followed by non-linearities (such as rectified linear units, sigmoid function, or otherwise) or other operations (e.g., normalization), which may be arranged in a feed-forward manner or in a manner with feedback and in-layer connections (e.g., a recurrent neural network (RNN) where sequences of training information may be used in some instances). For example, a recurrent neural network may be a long-short term memory (LSTM) neural network that includes one or more LSTM memory blocks, or a quasi-recurrent neural network (QRNN) which combines elements of convolutional networks with recurrent networks.

Parameters and weight values in the network may be used for a single multiplication, as in a fully connected neural network (DNN), or they may be "tied" or replicated across multiple locations within the network to form one or more receptive fields, such as in a convolutional neural network, a dilated convolutional neural network, a residual network unit, or similar. The specific structure for the networks may be explicitly specified at design time, or may be selected from a plurality of possible architecture candidates to ascertain the best performing candidate.

In some implementations, the variational network includes an output layer that includes a linear regression layer. The variational network may include at least one of (i) an output layer that includes a linear layer for regression of approximated channel output 712, or (ii) a sigmoid or hard-sigmoid activation layer for probability regression or slicing of the channel input 702, or (iii) an activation of a combination of sigmoid expressions such as a SoftMax or hierarchical SoftMax which can compute a probabilistic expression such as a pseudo-likelihood of a discrete message or set of bits.

The example of FIG. 8 shows only one possible implementation of a network structure that may be implemented. In general, implementations are not limited to these specific types of layers, and other configurations of layers and non-linearities may be used, such as dense, fully connected, and/or DNN layers, including rectified linear-unit (ReLU), sigmoid, tan h, and others. The network structure 800 uses these layers to predict an approximated channel output 712 for a channel input 702.

Figure 9:
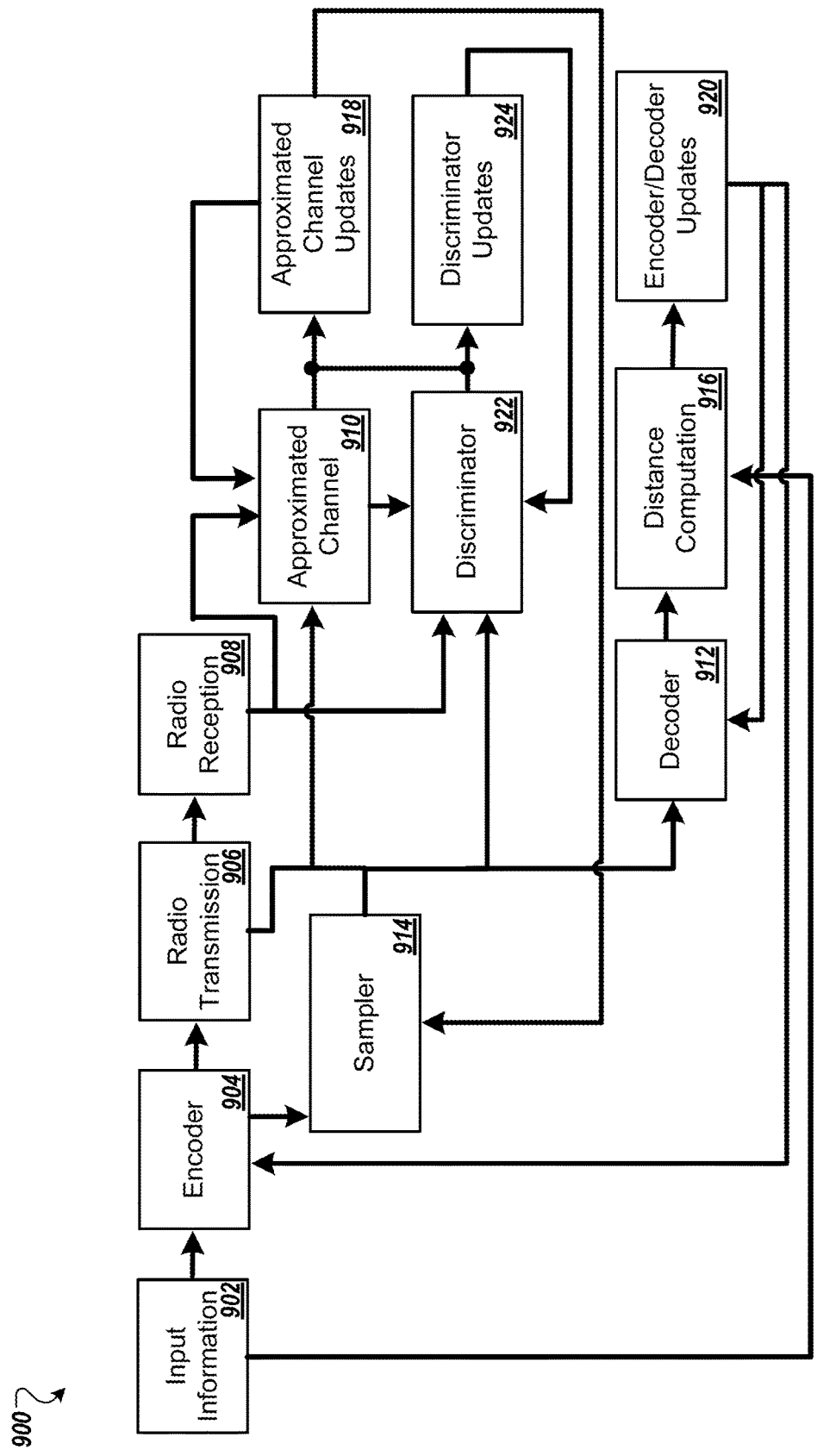
FIG. 9 illustrates an example of adversarially training an RF system that implements a machine-learning discriminator network and an approximated communication channel having a machine-learning network over RF channels.

Channel input 702 may be a transmitted signal (e.g., transmitted signal 130 as shown in FIG. 1), created by an encoder (e.g., encoder 904 as shown in FIG. 9). Channel input 702 may be the actual RF waveform in analog form, or may be a series of radio samples in time, frequency, or any other signal representation basis, or may be an intermediate representation (e.g., RF samples, basis coefficients, distributions over RF waveform values, etc.), for mapping the input information (e.g., input information 902 as shown in FIG. 9) into an RF waveform for transmission over a channel (e.g., channel 704 as shown in FIG. 7). Analogously, the channel output 712 may be a simulated received signal (e.g., simulated received signal 142 as shown in FIG. 1). Channel output 712 may be the simulated received RF waveform in analog form, or may be an intermediate representation (e.g., RF samples, basis coefficients, distributions over RF waveform values, etc.), for mapping a received RF waveform into reconstructed information (e.g., reconstructed information 116 as shown in FIG. 1). For example, the channel input 702 and the channel output 712 may represent distributions over RF waveform values.

FIG. 9 illustrates an example of adversarially training an RF system 900 that includes a sampler 914, a machine-learning encoder 904, a machine-learning decoder 912, a machine-learning discriminator 922, and a machine-learning approximated channel 910. The encoder 904 and the decoder 912 may implement encoding and decoding techniques that were learned by machine learning networks ("encoder network" and "decoder network") to communicate over a real-world RF channel (e.g., channel 804 as shown in FIG. 8, and channel 108 as shown in FIG. 1). The approximated channel 910 has a machine-learning network ("channel network") that is trained to approximate a real-world RF channel (e.g., channel 804 as shown in FIG. 8, and channel 108 as shown in FIG. 1). The discriminator 922 has a machine-learning network ("discriminator network") that is trained to differentiate a signal produced by approximated channel 910 from a signal produced by a real-world channel (e.g., channel 704 as shown in FIG. 7).

In some implementations, encoder 904 is encoder 104 as shown in FIG. 1. In some implementations, decoder 912 is decoder 114 as shown in FIG. 1. In some implementations, approximated channel 910 is approximated channel 120 as shown in FIG. 1. In some implementations, input information 902 is input information 102 as shown in FIG. 1.

In some implementations, the encoder network and the decoder network are utilized for training to learn suitable encoding and decoding mappings, and such mappings may be implemented in a deployed system using more simplified encoders and decoders. For example, a deployed system may utilize using lookup tables at the encoder and distance-based metrics at the decoder, or other simplified forms of encoding and decoding, that are designed based on results of training the encoder network and the decoder network.

The approximated channel 910 that is implemented during training may be a model of an RF channel that is obtained via simulation and/or based on real-world RF channel data (e.g., channel 804 as shown in FIG. 8, and channel 108 as shown in FIG. 1). For example, in some implementations, training begins with a simulated channel model to train the encoder network and the decoder network based on simulated propagation models reflecting a real world propagation environment or emitter data. The encoder network and the decoder network may then be further trained against a real channel where hardware is used with a training feedback loop.

In some implementations, the approximated channel 910 includes effects of transmitter and receiver components, such as filtering, amplification, modulation, etc. For example, in scenarios where a simulated channel is used for training, an analytic channel impairment model may be utilized that fits a specific set of hardware/software and wireless deployment conditions. As such, the training in FIG. 9 may train the encoder network and the decoder network to operate under different channel conditions, as well as for different real-world transmitter and receiver scenarios.

The discriminator 922 that is implemented during training is a binary classifier used to distinguish between signals that have passed through a real-world channel (e.g., channel output 710 as shown in FIG. 7, and received signal 140 as shown in FIG. 1) and those that have passed through an approximated channel (e.g., approximated channel output 712, and simulated received signal 142 as shown in FIG. 1), such as approximated channel 910.

As discussed above with reference to FIG. 7, the approximated channel 910/channel network and the discriminator 922/discriminator network may form a generative adversarial network (GAN).

During training, the encoder network and the decoder network may either be jointly trained or iteratively trained. For example, the encoder network and the decoder network may be jointly trained as an auto-encoder (as described in regards to FIG. 1, above). In some implementations, the encoder network and the decoder networks are separately/iteratively trained. In such scenarios, one of the networks may be fixed (e.g., weights may be frozen and not updated), either by previous training or by a transmission/reception scheme, while the other network is trained to learn an encoding/decoding strategy that is appropriate for the fixed counterpart network.

For example, the encoder network may be fixed to generate a particular mapping of input information 902 for radio transmission 906, and the decoder network may be trained to learn a mapping from the outputted RF signal of the approximated channel 210 (e.g., approximated channel output 712, and simulated received signal 142 as shown in FIG. 1) to reconstructed information (e.g., reconstructed information 116 as shown in FIG. 1) that is best suited for the fixed network of encoder 904. In some implementations, the input information 902 is represented by training data that is utilized for training purposes. The training data may have a different form than the input information 902, but nonetheless may represent the input information 902 for purposes of training. In such scenarios, the encoder network may process the training data that represents the input information 902, and the decoder network may generate reconstructed information as a reconstruction of the input information 902 represented by the training data.

Similarly, during training, the channel network of the approximated channel 910 may either be jointly trained or iteratively trained with the discriminator network of the discriminator 922. In some implementations, the channel network and the discriminator network are jointly trained, such that updates for both networks are determined and the networks are updated at the same time, at substantially the same time, and/or within the same iteration of the training process. In some implementations, the channel network is iteratively trained with the discriminator network. In these implementations, one of the networks may be fixed (e.g., parameter/layer weights of the networks are fixed and placed and not updated during the training process), while other network is updated.

Similarly, during training, the channel network and/or the discriminator network may either be jointly trained or iteratively trained with the encoder network and/or the decoder network as described in more detail above with respect to FIG. 2. In some implementations, the channel network and/or the discriminator network is separately/iteratively trained with the encoder network and/or the decoder network, where the channel network, the discriminator network, and the encoder network and/or the decoder network may have competing "adversarial" objectives. In such scenarios, one or more of the networks may be fixed, either by previous training or by a transmission/reception scheme, while one or more of the other networks are trained to either learn an encoding/decoding strategy that is appropriate for the fixed counterpart network(s) (e.g., for training the encoding network and/or the decoding network), to learn the transfer function of one or more analog electronic radio components and/or wireless transmission channels (e.g., for training the channel network), or to learn to accurately determine whether a signal is from a real-world channel or from an approximated channel (e.g., for training the discriminator network).

For example, the encoder network and the decoder network may be fixed to generate a particular mapping of input information 902 for radio transmission 906, and the channel network may be trained to learn the transfer function of one or more analog electronic radio components and/or wireless transmission channels (e.g., channel 704 as shown in FIG. 7, or channel 108 as shown in FIG. 1) while the discriminator network is also trained to accurately determine whether a signal is from a real-world channel or from an approximated channel. In some implementations, the input information 902 is represented by training data that is utilized for training purposes. The training data may have a different form than the input information 902, but nonetheless may represent the input information 202 for purposes of training. In such scenarios, the encoder network may process the training data that represents the input information 902, and the decoder network may generate reconstructed information as a reconstruction of the input information 902 represented by the training data.

The output of the encoder 904 may be a signal for transmission or simulated transmission (e.g., transmitted signal 130 as shown in FIG. 1). This signal may be provided to radio transmission 906. Radio transmission 906 may include a series of operations, including, for example, converting the signal from digital to analog form (e.g., by digital to analog converter 106 as shown in FIG. 1), amplifying the signal, and sending the signal by antenna. Radio transmission 906 may transmit the signal over various radio components and/or wireless transmission channels (e.g., channel 704 as shown in FIG. 7, or channel 108 as shown in FIG. 1). This signal may be altered as a result of being transmitted. Radio reception 908 receives the altered signal and may convert it form an analog format to digital format. Radio reception 908 may include, for example, an analog to digital converter (e.g., analog to digital converter 110 as shown in FIG. 1), and/or various analog electronic components (e.g., an antenna). Radio reception 908 outputs a received signal (e.g., channel output 710, or received signal 140 as shown in FIG. 1). This received signal is provided to the approximated channel 910 and the discriminator 922.

The output of the encoder 904 may also be provided to the sampler 914. Sampler 914 captures channel input/output pairs. Specifically, sampler 914 captures the outputs of radio reception 908 or approximated channel 910 with, as inputs, the outputs of encoder 904 or radio transmission 906. Sampler 914 outputs a signal ("sampled signal") to the approximated channel 910, the discriminator 922, and the decoder 912. The approximated channel 910 may produce a simulated received signal (e.g., approximated channel output 712 as shown in FIG. 7, or simulated received signal 142 as shown in FIG. 1). The simulated received signal may be provided to the discriminator 922 in addition to or in place of the sampled signal (e.g., discriminator may receive only the sampled signal during training, and only the simulated received signal during deployment). Decoder 912 may produce reconstructed information (e.g., reconstructed information 116) that attempts to reproduce input information 902.

The system 900 may compute a distance computation 916 between the input information 902 and the reconstructed information outputted from the decoder 912. The distance computation 916 may be a loss function. The distance computation 916 may be any suitable measure of distance between the input information 902 and the reconstructed information, such as (i) cross-entropy, (ii) mean squared error, (iii) other geometric distance metric (e.g., MAE), or (iv) another measure of accuracy of the reconstructed bits, codewords, or messages of the input information 902 from the reconstructed information. The results of the distance computation 916 are provided to encoder/decoder updates 920 in order to update the machine-learning networks of the encoder 904 and/or decoder 912. Here, the objective of the encoder/decoder updates 920 is to minimize the distance computation 916 in future iterations of the training process.

In some implementations, additional loss terms are used in the distance computation 916 in combination with such primary loss terms, for example to accomplish secondary objectives (e.g., to reduce interference imposed upon a secondary receiver, or to improve favorable signal properties such as peak to average power ratio (PAPR)).

In addition to achieving an objective that includes the distance computation 916/loss function, the system 900 may also be configured to achieve an objective related to other performance measures, such as throughput, error rates, power, bandwidth, complexity, or other performance metrics that are relevant for communication. In some implementations, the system 900 is configured to achieve a desired trade-off between different performance metrics. For example, achieving such a trade-off may be implemented using an objective function that combines different metrics, for example as a weighted combination of the metrics. In addition or as an alternative, this trade-off may be achieved by selecting a model according to user preferences or application specifications. In addition or as an alternative, the system 900 may implement one or more hard constraints on performance metrics, such as constraints on power, bandwidth, reconstruction error, etc.

The network update process (e.g., approximated channel updates 918, discriminator updates 924, and encoder/decoder updates 920) may update the channel network, the discriminator network, the encoder network, and/or the decoder network based on the various performance metrics. This updating may include updates to the network architectures, parameters, or weights of the networks. For example, the updating may include updating weights or parameters in one or more layers of the networks, selecting machine-learning models for the networks, or selecting a specific network architecture, such as choice of layers, layer-hyper-parameters, or other network features. As discussed, updating may be implemented on the channel network, the discriminator network, and the encoder and/or decoder network(s), in a joint or iterative manner.

During the update process (e.g., approximated channel updates 918, discriminator updates 924, and encoder/decoder updates 920), the output of the discriminator 922 (e.g., an indication of whether a received signal is believed to be produced by a real-world channel or an approximated channel) is provided to discriminator updates 924 and/or approximated channel updates 918. For example, during joint training of the channel network and the discriminator network, the output of the discriminator 922 may be provided to both the approximated channel updates 918 and the discriminator updates 924 since updates to both networks will be made. In contrast, during iterative training, for example, the channel network of approximated channel 910 may be fixed and the output of the discriminator 922 may only be provided to discriminator updates 924 in order to determine updates for the discriminator 922.

Similarly, during the update process (e.g., approximated channel updates 918, discriminator updates 924, and encoder/decoder updates 920), the output of the approximated channel 910 (e.g., approximated channel output 712 as shown in FIG. 7, or simulated received signal 142 as shown in FIG. 1) may be provided to approximated channel updates 918 and/or discriminator updates 924. For example, during joint training of the channel network and the discriminator network, the output of the approximated channel 910 may be provided to both the approximated channel updates 918 and the discriminator updates 924 (as well as to the discriminator 922) since updates to both networks will be made. In contrast, during iterative training, for example, the network of discriminator 922 may be fixed and the output of the approximated channel 910 may only be provided to approximated channel updates 918 in order to determine updates for the approximated channel 910 and its sampler 914.

Updates for the channel network of the approximated channel 910 may be determined by approximated channel updates 918 and provided to the approximated channel 910 and to the sampler 914 (which is part of the channel network of approximated channel 910).

Updates for the network of the discriminator 922 may be determined by discriminator updates 924 and provided to the discriminator 922.

As discussed above, the updates performed by the network update process (e.g., approximated channel updates 918, discriminator updates 924, and encoder/decoder updates 920) may be performed during training, and/or may be performed during deployment to further update the channel network, the discriminator network, the encoder network, and/or decoder network based on real-world deployment performance results.

In some implementations, the network update process (e.g., approximated channel updates 918, discriminator updates 924, and encoder/decoder updates 920) updates the channel network, the discriminator network, the encoder network, and/or decoder network to achieve a desired objective function(s), which may include loss function(s) (e.g., distance computation 916) and other performance metrics discussed above. In some implementations, the network update process utilizes an optimization method such as one of evolution (e.g., a genetic algorithm), gradient descent, stochastic gradient descent, or other solution technique.

As an example of gradient-based updates, the network update process (e.g., approximated channel updates 918, discriminator updates 924, and encoder/decoder updates 920) may calculate a rate of change of the objective function(s) relative to variations in the encoder network and/or decoder network, for example by calculating or approximating a gradient of the objective function. Such variations may include, for example, variations in the weights of one or more network layers, or other network architecture choices. Here, where the approximated channel 910 is based on real RF channel data and does not have a closed form gradient solution, the gradient of the objective function(s) is estimated using the channel machine-learning network of the approximated channel 910.

Based on the calculated rate of change of the objective function(s), the network update process (e.g., approximated channel updates 918, discriminator updates 924, and encoder/decoder updates 920) may determine a first variation for the encoder network and/or a second variation for the decoder network. These variations may be computed, for example, using Stochastic Gradient Descent (SGD) style optimizers, such as Adam, AdaGrad, Nesterov SGD, or others. In some implementations, these variations are computed using other scalable methods for direct search, such as evolutionary algorithms or particle swarm optimizations.

Once the variations have been determined, the network update process then applies those variations to the encoder network and/or the decoder network. For example, the network update process may update at least one encoding network weight in one or more layers of the encoder network, and/or at least one decoding network weight in one or more layers of the decoder network.

In general, updating the channel network, the discriminator network, the encoder network, and/or the decoder network is not limited to updating network weights, and other types of updates may be implemented. For example, updating the networks may include selecting a machine-learning model for the encoding network, from among a plurality of encoding models, and selecting a machine-learning model for the decoder network, from among a plurality of decoding models. In such implementations, selecting machine-learning models may include selecting a specific network architecture, such as choice of layers, layer-hyperparameters, or other network features.

By training the encoder network and/or decoder network over the approximated channel 910 having a channel network and emulating a real-world RF channel, the encoder network and decoder network may be optimized to communicate over a particular RF channel even for difficult cases (e.g., the transfer function of the component or wireless effect is hard to model or compensate for accurately or at low computational complexity in traditional systems, often leading to performance degradation). By using an approximated channel 910 having a channel network to train the encoder 904 and/or decoder 912 networks, the need for a closed form channel model or assumption about the channel effects on the system 200 are removed.

By the system 900 implementing both an approximated channel 910 having a channel network and a discriminator 922 having a network, the system implements a GAN. In addition, by using a sampler 914, the system 900 implements a variational-GAN which can accurately approximate the conditional distribution of a real-world channel (e.g., channel 704 as shown in FIG. 7, channel 108 as shown in FIG. 1, a stochastic channel, etc.).

In some implementations, the encoder network and the decoder network are also trained when a real-world channel is used (e.g., when the lower path is followed in FIG. 1). In such implementations, additional transmission and reception components (either hardware or software) are implemented to transmit and receive analog RF waveforms over the real channel. Such transmit and receive components may be implemented either in the encoder network and decoder network, or their effects may be included in the channel effects that are accounted for in the approximated channel 910.

Training the channel network, the discriminator network, the encoder network, and/or the decoder network may begin with any suitable set of initial conditions. For example, the training may begin with a random set of basis functions subject to certain conditions. Alternatively, the training may begin with a fixed set of basis functions, such as commonly used RF communication basis functions including Quadrature Phase-Shift Keying (QPSK) or Gaussian Binary Frequency Shift Keying (GFSK), orthogonal frequency division multiple access (OFDM), or other fixed set of basis functions.

During training, the encoder network and decoder network attempt to learn improved basis functions, according to results of encoding and decoding. Training the encoder 904 and decoder 912 may involve optimizing over a set of basis functions or over different sets of basis functions, for example using greedy search or other optimization-type algorithm.

In some implementations, the input information 902 is chosen from a training set of information. The input information 902 is, in some implementations, limited to a particular class of information, such as binary information, discrete-time information, analog waveforms, or other class of information. In such scenarios, the system 900 will be trained to learn communication encoding and decoding techniques that are tuned to communicate that particular class of information (over a particular channel). By training on different types of input information 902 and for a particular approximated channel 910 (e.g., that may emulate a particular real-world channel), the system 900 may be trained to learn near-optimal encoding and decoding operations for a particular communication scenario.

The distance computations/loss functions (e.g., distance computation 916) may be any suitable measure, or combination of measures, of distance between either the input information 902 and the reconstructed information, or the received signal and the simulated received signal. For example, the distance computations/loss functions may include cross-entropy, mean squared error (MSE), clipped MSE which penalizes predicted values according to MSE but only for values which fall on the wrong side of a decision threshold, or an exponential loss function that penalizes loss exponentially, or other suitable distance metric(s).

In addition, as discussed above, other performance metrics may be incorporated into training, for example as part of the distance computations/loss functions and/or as hard constraints, etc. For example, such performance metrics may include bit error rate (BER) as a function of the signal-to-noise ratio (SNR), communication bandwidth, communication power, spectral efficiency (the number of bits per second that can be transmitted over a fixed bandwidth channel at a specific SNR). Any one or combinations of such metrics may be utilized during training as part of the distance computations/loss functions (e.g., as a weighted combination) and/or as hard constraints in addition to the distance computations/loss functions.

Figure 10:
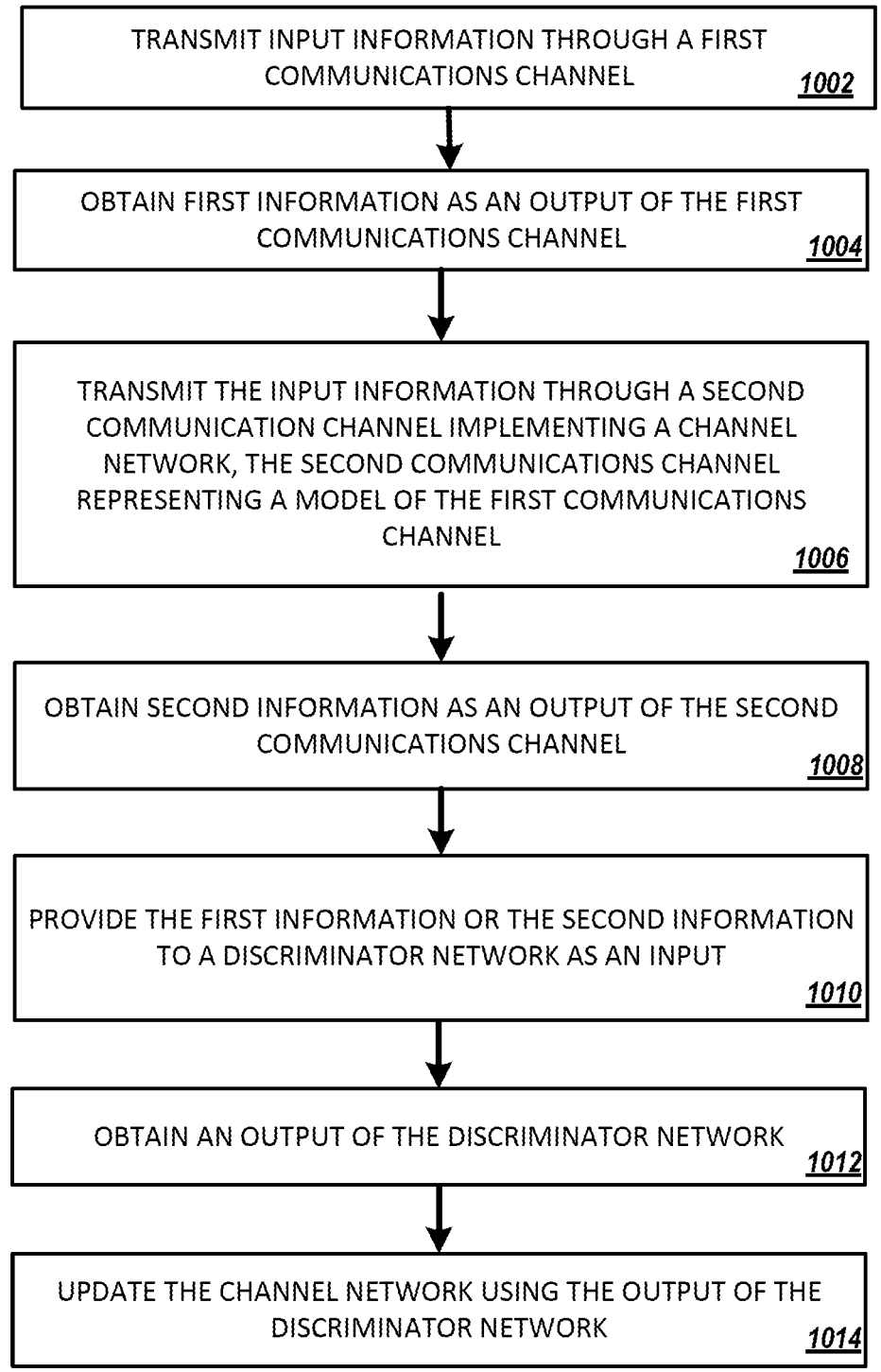
FIG. 10 illustrates an example flowchart for updating a machine-learning network of an approximated communication channel.

FIG. 10 is a flowchart illustrating an example method 1000 for training a machine-learning network of an approximated communications channel of an RF system. The training method 1000 may be performed by one or more processors, such as one or more CPUs, GPUs, DSPs, FPGAs, ASICs, TPUs, or neuromorphic chips or vector accelerators that execute instructions encoded on a computer storage medium.

In some implementations, the method 1000 is performed by the components of system 100 (and/or system 700, and/or system 800, and/or system 900), such as encoder 104 to produce transmitted signal 130, digital to analog converter 106 to convert the transmitted signal 130 to an analog signal, real-world channel 108 (or channel 704 as shown in FIG. 7) to have the analog signal transmitted over, analog to digital converter 110 to produce received signal 140, and decoder 114 to reconstruct the input information 102.

Accordingly, the method 1000 is described with respect to components of the system 100 (and/or system 700, and/or system 800, and/or system 900). However, the method 1000 also can be performed by other systems.

The method 1000 includes transmitting input information through a first communications channel (1002). First communications channel may include a single wireless transmission channel, multiple wireless transmission channels, various analog radio components, or a combination of one or more transmission channels and analog radio components. First communications channel may be a real-world communications channel, such as, for example, a wireless local area network (WLAN) channel, a Wi-Fi channel, a Bluetooth channel, a cellular network channel (e.g., one implementing GSM or UMTS technology), etc. First communications channel may be channel 108 as shown in FIG. 1, or channel 704 as shown in FIG. 7. Input information may include a RF signal, such as, for example, transmitted signal 130 as shown in FIG. 1. Input information may be channel input 702 as shown in FIGS. 7-8. Input information may be the output of encoder 904 as shown in FIG. 9. Input information may be the output of radio transmission 906 as shown in FIG. 9.

The method 1000 further includes obtaining first information as an output of the first communications channel (1004). In training scenarios, the effects of the first communication channel may be implemented by a model of a channel obtained by simulation and/or real channel data, or may be implemented by a real-world communication channel. The first information may represent an analog RF waveform that is received over a channel, or may be an intermediate representation (e.g., samples, basis coefficients, distributions over RF waveforms etc.) that is a result of processing (e.g., filtering, sampling, equalizing, etc.) a received analog RF waveform. The first information may be received signal 140 as shown in FIG. 1. The first information may be channel output 710 as shown in FIG. 7. The first information may be the output of radio reception 908 as shown in FIG. 9.

The method 1000 further includes transmitting the input information through a second communications channel implementing a channel machine-learning network, the second communications channel representing a model of the first communications channel (1006). The second communications channel can be an approximated channel, such as, for example, approximated channel 120 as shown in FIG. 1, approximated channel 706 as shown in FIGS. 7-8, or approximated channel 910 as shown in FIG. 9. In some implementations, transmitting the input information involves simulating transmission of the input information through the second communications.

The method 1000 further includes obtaining second information as an output of the second communications channel (1008). The second information may be the simulated received signal 142 as shown in FIG. 1. The second information may be the approximated channel output 712 as shown in FIGS. 7-8. The second information may be the output of the approximated channel 910 as shown in FIG. 2.

The method 1000 further includes providing the first information or the second information to a discriminator machine-learning network as an input (1010). The discriminator may be a binary classifier used to accurately distinguish between outputs of a real-world channel and outputs of an approximated channel/channel model. Discriminator may be discriminator 708 as shown in FIG. 7. Discriminator may be discriminator 922 as shown in FIG. 9.

The method 1000 further includes obtaining an output of the discriminator machine-learning network (1012). The output of the discriminator may be a binary output. For example, discriminator may output a 1 to represent that it approximates that the information it received was from an approximated channel, and may output a 0 to represent that it approximates that the information it received was from a real-world channel.

The method 1000 further includes updating the channel machine-learning network using the output of the discriminator machine-learning network (1014). This update may be applied to the channel machine-learning network in a joint or iterative manner (with respect the discriminator machine-learning network), or individually, as discussed above. The updates may generally include updating any suitable machine-learning network feature of the encoder network and/or decoder network, such as network weights, architecture choice, machine-learning model, or other parameter or connectivity design, as discussed in regards to FIGS. 8-9, above. As an example, an update to the channel machine-learning network may include adjusting network layer(s) 802, network layer(s) 810, latent distribution parameters 804, latent space 806, or the sampler 808.

Figure 11:
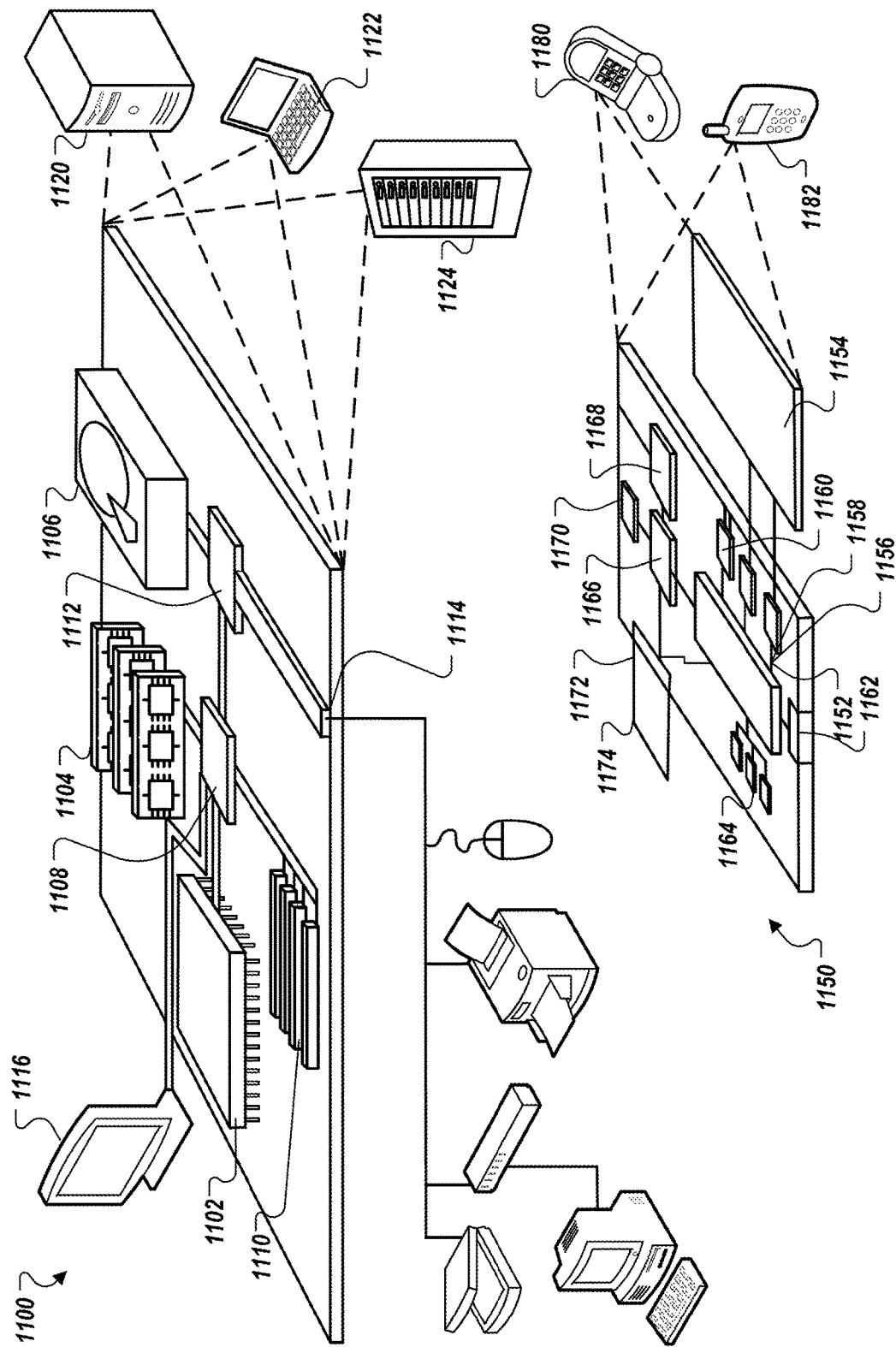
FIG. 11 is a diagram illustrating an example of a computing system that may be used to implement one or more components of a system that performs learned communication over RF channels.

FIG. 11 is a diagram illustrating an example of a computing system that may be used to implement one or more components of a system that performs learned communication over RF channels.

The computing system includes computing device 1100 and a mobile computing device 1150 that can be used to implement the techniques described herein. For example, one or more parts of an encoder machine-learning network system or a decoder machine-learning network system could be an example of the system 1100 described here, such as a computer system implemented in any of the machine-learning networks, devices that access information from the machine-learning networks, or a server that accesses or stores information regarding the encoding and decoding performed by the machine-learning networks.

The computing device 1100 is intended to represent various forms of digital computers, such as laptops, desktops, workstations, personal digital assistants, servers, blade servers, mainframes, and other appropriate computers. The mobile computing device 1150 is intended to represent various forms of mobile devices, such as personal digital assistants, cellular telephones, smart-phones, mobile embedded radio systems, radio diagnostic computing devices, and other similar computing devices. The components shown here, their connections and relationships, and their functions, are meant to be examples only, and are not meant to be limiting.

The computing device 1100 includes a processor 1102, a memory 1104, a storage device 1106, a high-speed interface 1108 connecting to the memory 1104 and multiple high-speed expansion ports 1110, and a low-speed interface 1112 connecting to a low-speed expansion port 1114 and the storage device 1106. Each of the processor 1102, the memory 1104, the storage device 1106, the high-speed interface 1108, the high-speed expansion ports 1110, and the low-speed interface 1112, are interconnected using various busses, and may be mounted on a common motherboard or in other manners as appropriate. The processor 1102 can process instructions for execution within the computing device 1100, including instructions stored in the memory 1104 or on the storage device 1106 to display graphical information for a GUI on an external input/output device, such as a display 1116 coupled to the high-speed interface 1108. In other implementations, multiple processors and/or multiple buses may be used, as appropriate, along with multiple memories and types of memory. In addition, multiple computing devices may be connected, with each device providing portions of the operations (e.g., as a server bank, a group of blade servers, or a multi-processor system). In some implementations, the processor 1102 is a single-threaded processor. In some implementations, the processor 1102 is a multi-threaded processor. In some implementations, the processor 1102 is a quantum computer.

The memory 1104 stores information within the computing device 1100. In some implementations, the memory 1104 is a volatile memory unit or units. In some implementations, the memory 1104 is a non-volatile memory unit or units. The memory 1104 may also be another form of computer-readable medium, such as a magnetic or optical disk.

The storage device 1106 is capable of providing mass storage for the computing device 1100. In some implementations, the storage device 1106 is or includes a computer-readable medium, such as a floppy disk device, a hard disk device, an optical disk device, or a tape device, a flash memory or other similar solid-state memory device, or an array of devices, including devices in a storage area network or other configurations. Instructions can be stored in an information carrier. The instructions, when executed by one or more processing devices (for example, processor 1102), perform one or more methods, such as those described above. The instructions can also be stored by one or more storage devices such as computer- or machine-readable mediums (for example, the memory 1104, the storage device 1106, or memory on the processor 1102). The high-speed interface 1108 manages bandwidth-intensive operations for the computing device 1100, while the low-speed interface 1112 manages lower bandwidth-intensive operations. Such allocation of functions is an example only. In some implementations, the high-speed interface 1108 is coupled to the memory 1104, the display 1116 (e.g., through a graphics processor or accelerator), and to the high-speed expansion ports 1110, which may accept various expansion cards (not shown). In the implementation, the low-speed interface 1112 is coupled to the storage device 1106 and the low-speed expansion port 1114. The low-speed expansion port 1114, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 1100 may be implemented in a number of different forms, as shown in the figure. For example, it may be implemented as a standard server 1120, or multiple times in a group of such servers. In addition, it may be implemented in a personal computer such as a laptop computer 1122. It may also be implemented as part of a rack server system 1124. Alternatively, components from the computing device 1100 may be combined with other components in a mobile device (not shown), such as a mobile computing device 1150. Each of such devices may include one or more of the computing device 1100 and the mobile computing device 1150, and an entire system may be made up of multiple computing devices communicating with each other.

The mobile computing device 1150 includes a processor 1152, a memory 1164, an input/output device such as a display 1154, a communication interface 1166, and a transceiver 1168, among other components. The mobile computing device 1150 may also be provided with a storage device, such as a micro-drive or other device, to provide additional storage. Each of the processor 1152, the memory 1164, the display 1154, the communication interface 1166, and the transceiver 1168, are interconnected using various buses, and several of the components may be mounted on a common motherboard or in other manners as appropriate.

The processor 1152 can execute instructions within the mobile computing device 1150, including instructions stored in the memory 1164. The processor 1152 may be implemented as a chipset of chips that include separate and multiple analog and digital processors. The processor 1152 may provide, for example, for coordination of the other components of the mobile computing device 1150, such as control of user interfaces, applications run by the mobile computing device 1150, and wireless communication by the mobile computing device 1150.

The processor 1152 may communicate with a user through a control interface 1158 and a display interface 1156 coupled to the display 1154. The display 1154 may be, for example, a TFT (Thin-Film-Transistor Liquid Crystal Display) display or an OLED (Organic Light Emitting Diode) display, or other appropriate display technology. The display interface 1156 may include appropriate circuitry for driving the display 1154 to present graphical and other information to a user. The control interface 1158 may receive commands from a user and convert them for submission to the processor 1152. In addition, an external interface 1162 may provide communication with the processor 1152, so as to enable near area communication of the mobile computing device 1150 with other devices. The external interface 1162 may provide, for example, for wired communication in some implementations, or for wireless communication in other implementations, and multiple interfaces may also be used.

The memory 1164 stores information within the mobile computing device 1150. The memory 1164 can be implemented as one or more of a computer-readable medium or media, a volatile memory unit or units, or a non-volatile memory unit or units. An expansion memory 1174 may also be provided and connected to the mobile computing device 1150 through an expansion interface 1172, which may include, for example, a SIMM (Single In Line Memory Module) card interface. The expansion memory 1174 may provide extra storage space for the mobile computing device 1150, or may also store applications or other information for the mobile computing device 1150. Specifically, the expansion memory 1174 may include instructions to carry out or supplement the processes described above, and may include secure information also. Thus, for example, the expansion memory 1174 may be provide as a security module for the mobile computing device 1150, and may be programmed with instructions that permit secure use of the mobile computing device 1150. In addition, secure applications may be provided via the SIMM cards, along with additional information, such as placing identifying information on the SIMM card in a non-hackable manner.

The memory may include, for example, flash memory and/or NVRAM memory (non-volatile random access memory), as discussed below. In some implementations, instructions are stored in an information carrier such that the instructions, when executed by one or more processing devices (for example, processor 1152), perform one or more methods, such as those described above. The instructions can also be stored by one or more storage devices, such as one or more computer- or machine-readable mediums (for example, the memory 1164, the expansion memory 1174, or memory on the processor 1152). In some implementations, the instructions are received in a propagated signal, for example, over the transceiver 1168 or the external interface 1162.

The mobile computing device 1150 may communicate wirelessly through the communication interface 1166, which may include digital signal processing circuitry where necessary. The communication interface 1166 may provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), LTE, 5G/6G cellular, among others. Such communication may occur, for example, through the transceiver 1168 using a radio frequency. In addition, short-range communication may occur, such as using a Bluetooth, Wi-Fi, or other such transceiver (not shown). In addition, a GPS (Global Positioning System) receiver module 1170 may provide additional navigation- and location-related wireless data to the mobile computing device 1150, which may be used as appropriate by applications running on the mobile computing device 1150.

The mobile computing device 1150 may also communicate audibly using an audio codec 1160, which may receive spoken information from a user and convert it to usable digital information. The audio codec 1160 may likewise generate audible sound for a user, such as through a speaker, e.g., in a handset of the mobile computing device 1150. Such sound may include sound from voice telephone calls, may include recorded sound (e.g., voice messages, music files, etc.) and may also include sound generated by applications operating on the mobile computing device 1150.

The mobile computing device 1150 may be implemented in a number of different forms, as shown in the figure. For example, it may be implemented as a cellular telephone 1180. It may also be implemented as part of a smart-phone 1182, personal digital assistant, or other similar mobile device.

The term "system" as used in this disclosure may encompass all apparatus, devices, and machines for processing data, including by way of example a programmable processor, a computer, or multiple processors or computers. A processing system can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, executable logic, or code) can be written in any form of programming language, including compiled or interpreted languages, or declarative or procedural languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Computer readable media suitable for storing computer program instructions and data include all forms of non-volatile or volatile memory, media and memory devices, including by way of example semiconductor memory devices, e.g., EPROM, EEPROM, and flash memory devices; magnetic disks, e.g., internal hard disks or removable disks or magnetic tapes; magneto optical disks; and CD-ROM and DVD-ROM disks. The processor and the memory can be supplemented by, or incorporated in, special purpose logic circuitry. Sometimes a server is a general-purpose computer, and sometimes it is a custom-tailored special purpose electronic device, and sometimes it is a combination of these things.

Implementations can include a back end component, e.g., a data server, or a middleware component, e.g., an application server, or a front end component, e.g., a client computer having a graphical user interface or a Web browser through which a user can interact with an implementation of the subject matter described is this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

While this disclosure contains many specific implementation details, these should not be construed as limitations on the scope of any invention or of what may be claimed, but rather as descriptions of features that may be specific to particular implementations of particular inventions. Certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the implementations described above should not be understood as requiring such separation in all implementations, and it should be understood that the described program components and systems can generally be integrated together in a single software product or packaged into multiple software products.

What is claimed is:

1. A method performed by at least one processor to train at least one machine-learning network to communicate over a communication channel, the method comprising:
    transmitting input information through a first communication channel;
    obtaining first information as an output of the first communication channel;
    transmitting the input information through a second communication channel implementing a channel machine-learning network, the second communication channel representing a model of the first communication channel;
    obtaining second information as an output of the second communication channel;
    providing the first information or the second information to a discriminator machine-learning network as an input;
    obtaining an output of the discriminator machine-learning network;
    updating the channel machine-learning network using the output of the discriminator machine-learning network; and
    using the second communication channel implementing the updated channel machine-learning network to determine one or more performance metrics that represent an estimate of the performance of the first communication channel.

2. The method of claim 1, wherein the output of the discriminator machine-learning network indicates a decision by the discriminator machine-learning network whether the input provided to the discriminator machine-learning network was the output of the first communication channel or the second communication channel.

3. The method of claim 1 wherein the output of the discriminator machine-learning network indicates a degree of similarity between the first communication channel and the second communication channel.

4. The method of claim 1, wherein the channel machine-learning network is conditioned on one or more locations of one or more radios transceiving the input information or the first information.

5. The method of claim 1, wherein using the second communication channel with the updated channel machine-learning network comprises:
    transmitting second input information through the second communication channel implementing the updated channel machine-learning network;
    obtaining third information as an output of the second communication channel; and
    based on the second input information and the third information, determining the one or more performance metrics that represent the estimate of the performance of the first communication channel.

6. The method of claim 5, wherein determining the one or more performance metrics comprises using the second communication channel to determine an estimate of a channel response for the first communication channel.

7. The method of claim 1, wherein the one or more performance metrics include at least one of the following:
    a signal strength;
    a signal coverage;
    a signal quality;
    a bit error rate;

a reconstruction error;
a signal-to-noise ratio;
a communication bandwidth;
a communication latency;
a communication power consumption;
a spectral efficiency;
a level of interference;
a level of fading;
a level of distortion;
a mean squared error; and
an error vector magnitude.

8. The method of claim 1, comprising using the one or more performance metrics to determine signal coverage or an estimate of signal coverage in a geographic area.

9. The method of claim 1, comprising using the one or more performance metrics to determine a location for at least one of a radio tower, a cell tower, an antenna, a remote radio head, or an antenna array.

10. The method of claim 9, wherein the determined location is an existing location, and wherein using the one or more performance metrics to determine the existing location comprises determining that the one or more performance metrics meet performance criteria for identifying an existing location for the at least one of the radio tower, the cell tower, the antenna, the remote radio head, or the antenna array.

11. The method of claim 10, wherein the performance criteria includes a threshold signal strength or signal quality, and
wherein determining that the one or more performance metrics meet the performance criteria for determining the location comprises determining, from the one or more performance metrics, that (i) a signal strength at the existing location is greater than the threshold signal strength or (ii) a signal quality at the existing location is greater than the threshold signal quality.

12. The method of claim 9, wherein the determined location is an existing location, and wherein the one or more performance metrics indicate that a signal quality or signal strength at the existing location is greater than a signal quality or signal strength at one or more other locations adjacent to the existing location, and
wherein using the one or more performance metrics to determine the location comprises determining that (i) the signal quality at the existing location is greater than the signal quality at the one or more adjacent locations or (ii) the signal strength at the existing location is greater than the signal strength at the one or more adjacent locations.

13. The method of claim 9, wherein the determined location is a candidate location, and wherein using the one or more performance metrics to determine the location comprises determining that the one or more performance metrics meet performance criteria for a candidate location for the at least one of the radio tower, the cell tower, the antenna, the remote radio head, or the antenna array.

14. The method of claim 13, wherein the performance criteria includes a threshold signal strength or signal quality, and
wherein determining that the one or more performance metrics meet the performance criteria for the candidate location comprises determining, from the one or more performance metrics, that (i) a signal strength at the candidate location is less than the threshold signal strength or (ii) a signal quality at the candidate location is less than the threshold signal quality.

15. The method of claim 9, wherein the determined location is a candidate location, and wherein the one or more performance metrics indicate that a signal quality or signal strength at the candidate location is less than a signal quality or signal strength at one or more other locations adjacent to the candidate location, and
wherein using the one or more performance metrics to determine the candidate location comprises determining that (i) the signal quality at the candidate location is less than the signal quality at the one or more adjacent locations or (ii) the signal strength at the candidate location is less than the signal strength at the one or more adjacent locations.

16. The method of claim 1, wherein the one or more performance metrics indicate signal interference in a first band of frequencies corresponding to the transmission of the input information through the second communication channel, and
the method further comprises updating the channel machine-learning network to use a second band of frequencies that is different from the first band of frequencies.

17. The method of claim 1, wherein the input information is a first radio-frequency signal generated by an encoder machine-learning network, and
wherein the first information or the second information is a second radio-frequency signal that is sent to a decoder machine-learning network for processing.

18. The method of claim 17, comprising training at least one of the channel machine-learning network, the encoder machine-learning network, the decoder machine-learning network, or the discriminator machine-learning network using a propagation model,
wherein the propagation model corresponds to a real-world propagation environment.

19. A system comprising:
at least one processor; and
at least one computer memory coupled to the at least one processor having stored thereon instructions which, when executed by the at least one processor, cause the at least one processor to perform operations comprising:
transmitting input information through a first communication channel;
obtaining first information as an output of the first communication channel;
transmitting the input information through a second communication channel implementing a channel machine-learning network, the second communication channel representing a model of the first communication channel;
obtaining second information as an output of the second communication channel;
providing the first information or the second information to a discriminator machine-learning network as an input;
obtaining an output of the discriminator machine-learning network;
updating the channel machine-learning network using the output of the discriminator machine-learning network; and
using the second communication channel implementing the updated channel machine-learning network to determine one or more performance metrics that represent an estimate of the performance of the first communication channel.

20. One or more non-transitory computer-readable media, storing a computer program, the program comprising instructions that when executed by one or more processing devices cause the one or more processing devices to perform operations comprising:
- transmitting input information through a first communication channel;
- obtaining first information as an output of the first communication channel;
- transmitting the input information through a second communication channel implementing a channel machine-learning network, the second communication channel representing a model of the first communication channel;
- obtaining second information as an output of the second communication channel;
- providing the first information or the second information to a discriminator machine-learning network as an input;
- obtaining an output of the discriminator machine-learning network;
- updating the channel machine-learning network using the output of the discriminator machine-learning network; and
- using the updated channel machine-learning network to predict a channel response.

* * * * *